US006636666B2

(12) United States Patent
Chan et al.

(10) Patent No.: US 6,636,666 B2
(45) Date of Patent: Oct. 21, 2003

(54) OPTICAL POWER EQUALIZER

(75) Inventors: Winston K. Chan, Princeton, NJ (US); David R. Andersen, Mt. Vernon, IA (US)

(73) Assignee: University of Iowa Research Foundation, Iowa City, IA (US)

(*) Notice: Subject to any disclaimer, the term of this patent is extended or adjusted under 35 U.S.C. 154(b) by 0 days.

(21) Appl. No.: 09/853,671

(22) Filed: May 14, 2001

(65) Prior Publication Data

US 2002/0181867 A1 Dec. 5, 2002

(51) Int. Cl.[7] .................................................. G02B 6/34
(52) U.S. Cl. ......................... 385/37; 385/122; 359/566; 359/569; 359/573
(58) Field of Search ........................... 385/37; 359/566, 359/568–576

(56) References Cited

U.S. PATENT DOCUMENTS

| | | | |
|---|---|---|---|
| 4,168,427 A | 9/1979 | Hubbard | 250/199 |
| 4,238,648 A | 12/1980 | Epworth | 179/170 D |
| 4,484,795 A | 11/1984 | Byron | 350/96.19 |
| 5,155,780 A | 10/1992 | Zirngibl | 385/27 |
| 5,225,922 A | 7/1993 | Chraplyvy et al. | 359/124 |
| 5,311,606 A | 5/1994 | Asakura et al. | 385/33 |
| 5,460,907 A * | 10/1995 | Ducharme et al. | 365/124 |
| 5,608,825 A | 3/1997 | Ip | 385/24 |
| 5,615,289 A | 3/1997 | Duck et al. | 385/24 |
| 5,689,594 A | 11/1997 | Mao | 385/24 |
| 5,717,798 A | 2/1998 | Strasser et al. | 385/37 |
| 5,732,169 A | 3/1998 | Riant et al. | 385/24 |
| 5,808,787 A | 9/1998 | Meli et al. | 359/341 |
| 5,812,710 A | 9/1998 | Sugaya | 385/27 |
| 5,861,980 A | 1/1999 | Ono | 359/341 |
| 5,881,199 A | 3/1999 | Li | 385/140 |
| 5,917,635 A | 6/1999 | Cvijetc et al. | 359/179 |
| 5,926,590 A | 7/1999 | Mao | 385/24 |
| 5,933,552 A | 8/1999 | Fukushima et al. | 385/24 |
| 5,978,131 A | 11/1999 | Lauzon et al. | 359/341 |
| 6,016,379 A | 1/2000 | Bulow | 385/147 |
| 6,040,933 A | 3/2000 | Khaleghi et al. | 359/124 |
| 6,058,227 A | 5/2000 | Wong | 385/16 |
| 6,104,848 A | 8/2000 | Toyohara et al. | 385/24 |
| 6,115,157 A | 9/2000 | Barnard et al. | 359/124 |
| 6,134,034 A | 10/2000 | Terahara | 359/124 |
| 6,363,097 B1 * | 3/2002 | Linke et al. | 359/3 |

OTHER PUBLICATIONS

C.R. Giles and D.J. DiGiovanni, "Dynamic Gain Equalization in Two–Stage Fiber Amplifers," *IEEE Phot. Technol. Letts.*, vol. 2, No. 12, 866–868, (1990).

M. Tachibana, R.I. Laming, P.R. Morkel and D.N. Payne, "Erbium–Doped Fiber Amplifier with Flattened Gain Spectrum," *IEEE Phot. Technol. Letts.*, vol. 3, No. 2, 118–120, (1991).

(List continued on next page.)

*Primary Examiner*—John D. Lee
*Assistant Examiner*—Scott Knauss
(74) *Attorney, Agent, or Firm*—Fleshner & Kim, LLP

(57) ABSTRACT

The methods and apparatus according to the invention equalize the power of at least one frequency in a multi-wavelength optical signal, or limit the power contained in a single or multi-frequency signal. More particularly, the optical power equalizer according to the invention is a filter with separably variable wavelength dependent transmission coefficients, wherein each coefficient decreases with increasing power for each respective wavelength coupled to the equalizer. Thus, the highest power wavelength output from an EDFA will be filtered more than the lower power wavelengths, making the output power from the EDFA more evenly distributed among the wavelengths. Such an equalizer can be placed downstream from each EDFA without destabilizing the optical network so that no changes need to be made to the EDFA or to the other components in the system.

68 Claims, 19 Drawing Sheets

OTHER PUBLICATIONS

A.E. Willner and S.M. Hwang, "Transmission of Many WDM Channels Through a Cascade of EDFA's in Long Distance Links and Ring Networks," *J. Lightwave Technol.*, vol. 13, No. 5, 802–816, (1995).

G.K. Chang, G. Ellinas, J.K. Gamelin, M.Z. Iqbal and C.A. Brackett, "Multiwavelength Reconfigurable WDM/ATM/SONET Network Testbed," *J. Lightwave Technol.*, vol. 14, No. 6, 1320–1340, (1996).

R.E. Wagner, R.C. Alferness, A.A.M. Saleh and M.S. Goodman, "MONET: Multiwavelength Optical Networking," *J. Lightwave Technol.*, vol. 14, No. 6, 1349–1355, (1996).

L. Eskildsen, E. Goldstein, V. da Silva, M. Andrejco and Y. Silberberg, "Optical Power Equalization for Multiwavelength Fiber–Amplifer Cascades Using Periodic Inhomogeneous Broadening," *IEEE Phot. Technol. Letts.*, vol. 5, No. 10, 1188–1190, (1993).

K. Inoue, T. Kominato and H. Toba, "Tunable Gain Equalization Using a Mach–Zehnder Optical Filter in Multistage Fiber Amplifiers," *IEEE Phot. Technol. Letters.*, vol. 3, No. 8, 718–720, (1991).

F. Su, R. Olshansky, G. Joyce, D.A. Smith and J.E. Baran, "Gain Equalization in Multiwavelength Lightwave Systems Using Acoustooptic Tunable Filters," *IEEE Phot. Tehnol. Letts.*, vol. 4, No. 3, 269–271, (1992).

F. Khaleghi, M. Kavehrad and C. Barnard, "Tunable Coherent Optical Transversal EDFA Gain Equlization," *J. Lightwave Technol.*, vol. 13, No. 4, 581–587, (1995).

P.Yeh, Introduction to Photorefractive Nonlinear Optics, John Wiley & Sons, Inc., (New York, 1993).

W.A. Schroeder, T.S. Stark, M.D. Dawson, T.F. Boggess, and A.L. Smirl, "Picosecond separation and measurement of coexisting photorefractive, bound–electronic, and free–carrier grating dynamics in GaAs," *Opt. Lett.*, vol. 16, No. 3, 159–161, (1991).

P.Yeh, "Contra–Directional Two–Wave Mixing in Photorefractive Media," *Optics Commun.*, vol. 45, No. 5, 323–326, (1983).

W. Chen and D.L. Mills, "Optical Response of a Nonlinear Dielectric Film," *Phys. Rev. B*, vol. 35, No. 2, 524–532, (1987).

W. Chan and D. Anderson, "Passive and adaptive optical equalizer for reconfigurable multiwavelength networks," *Optical Society of America*, vol. 18, No. 7, 901–907, (2001).

D.P. Norwood, H.E. Swooboda, M.D. Dawson, A.L. Smirl, D.R. Anderson, T.C. Hasenberg, "Room–temperature short–period transient grating measurement of perpendicular transport in GaAs/AlGaAs multiple quantum wells," *Appl. Phys. Lett.*, vol. 59, No. 2, 219–221 (1991).

W.J. Miniscalco, "Erbium–Doped Glasses for Fiber Amplifiers at 1500 nm," *J.Lightwave Tech.*, vol. 9, No. 2, 234–250 (1991).

* cited by examiner

OPTICAL POWER EQUALIZER

BACKGROUND OF THE INVENTION

1. Field of the Invention

The invention relates to a method and apparatus for equalizing the power of at least one frequency in a multi-wavelength optical signal, and limiting the power in an optical system. More particularly, the invention relates to a method and apparatus for equalizing the power of at least one frequency in a multi-wavelength optical signal that equalizes without spectrally dispersing the signal.

2. Background of the Related Art

Extremely low losses in optical fibers have made them the transmission medium of choice for communications networks. These losses, however, are not zero so transmitted optical signals need to be amplified to compensate for the losses. Moreover, signals in all but the simplest networks split among several paths would each require amplification.

In a few short years, the erbium doped fiber amplifier (EDFA) has revolutionized optical networks by providing amplification of optical signals without conversion to and from the electrical domain. FIG. 1 shows the gain versus input signal wavelength for 3 different EDFAs based on A1/P Silica, Silicate L22, and Fluorozirconate F88, respectively. FIG. 1 is reproduced from J. Miniscalco, J. Lightwave Tech. 9, 234 (1991), which is hereby incorporated by reference herein. As indicted by FIG. 1, each type of EDFA has a gain peak centered at about 1530 nm (nanometers), with substantially reduced gain at wavelengths below about 1490 nm and above about 1580 nm. For an input signal between 1490 nm and 1580 nm, the gain of the EDFA is still strongly dependant on input wavelength. For virtually any given multi-wavelength input signal, the EDFA will amplify each wavelength a different amount. FIG. 1 shows that even when the multi-wavelength input signal has an even power distribution, the output of the EDFA will not have a uniform distribution of power between the wavelengths.

When amplifying a single wavelength, the pump power and the signal wavelength determine the gain. To maintain a substantially constant optical power level in a conventional substantially single wavelength system throughout the system, each EDFA has a feedback circuit that controls the pump power while monitoring the output power. Thus, even a relatively simple system relying on a single frequency requires a complex feedback mechanism to assure a stable network.

The EDFA has a more complex behavior when it simultaneously amplifies several wavelengths. The gain at a particular wavelength depends, in addition to the pump power and the wavelength, on its input power relative to those at the other wavelengths. Specifically, the gain is greatest for the wavelengths that already have the most power and least for the weakest power wavelengths. The gain differential is modest, so it is generally not a serious problem for small multi-wavelength networks containing just a few EDFA's. But as the size of the network grows, the effects of the gain differential accumulate, and can lead to instability in the network with a few wavelengths dominating.

The output spectrum of the EDFA ideally should be flat, or equalized, to avoid instabilities due to single wavelength domination. It is not sufficient to simply equalize the EDFA gain. The instability still occurs with a flat gain if the input spectrum is not flat. Thus, a general solution to this problem must equalize the EDFA output rather than its gain.

If it is possible to predict with reasonable accuracy the input power distribution to each EDFA, then one can insert compensating filters that attenuate the stronger wavelengths more than the weaker ones so that each EDFA output power distribution is spectrally flat or equalized. For example, see C. R. Giles and D. I. DeGiovanni, "Dynamic Gain Equalization in Two-Stage Fiber Amplifiers," *IEEE Phot. Technol. Letts.*, 2,866–868, (1990); M. Tachibana, R. I. Laming, P. R. Morkel and D. N. Payne, "Erbium-Doped Fiber: Amplifier with Flattened Gain Spectrum," *IEEE Phot. Technol. Letts.*, 3, 118–120, (1991); and A. E. Willner and S. -M. Hwang, "Transmission of Many WDM Channels Through a Cascade of EDFA's in Long Distance Links and Ring Networks," *J. Lightwave Technol.*, 5, 802–816, (1995), which are hereby incorporated by reference. But such an approach works best if the network is static. A change in the input power distribution of one EDFA will disrupt power equalization throughout the system. In turn, this will upset the input power distribution to other EDFA's, disrupt their equalization and may eventually cause a network-wide instability. Such changes in the power distribution would be common in reconfigurable systems where wavelengths are intentionally switched from one path to another.

It is these reconfigurable optical fiber systems that are most attractive for large multi-wavelength networks. For example, see G. K. Chang, G. Ellinas, J. K. Gamelin, M. z. Iqbal and C. A. Brackett, "Multiwavelength Reconfigurable WDM/ATM/SONET Network Testbed," *J. Lightwave Technol.*, 14, 1320–1340, (1996); and R. E. Wagner, R. C. Alfemess, A. A. M. Saleh and M. S. Goodman, "MONET: Multiwavelength Optical Networking," *J. Lightwave Technol.*, 14, 1349–1355, (1996), which are hereby incorporated by reference. For these networks to function properly, the output of each EDFA must remain equalized even as the input power distribution varies. The gain required to maintain a flat output spectrum will vary as the input varies. A power equalizer must continuously sense the power at each wavelength and alter the power at that wavelength accordingly. The equalizer must treat each wavelength independently so that a strong wavelength will be attenuated without attenuating the weaker ones. Besides these basic requirements, the equalizer should have features that would make it attractive for widespread use such as scalability in the number of wavelengths, low cost, reliability, ease of use, etc.

Several approaches have been demonstrated to try to solve this problem. Experiments showing that the coupling between wavelengths in EDFA's decreases at cryogenic temperatures because the gain becomes inhomogeneously broadened, suggest operating the EDFA at cryogenic temperatures. For example, see L. Eskildsen, E. Goldstein, V. da Silva, M. Andrejco and Y. Silberberg, "Optical Power Equalization for Multiwavelength Fiber-Amplifier Cascades Using Periodic Inhomogeneous Broadening," *IEEE Phot. Technol. Letts.*, 5, 1188–1190, (1993), which is hereby incorporated by reference. However, cryogenic cooling is not economically attractive.

A different approach is to disperse the light spectrally, measure the power at each wavelength, and adjust a tunable filter for each wavelength according to the measured powers. For example, see K. Inoue, T. Kominato and H. Toba, "Tunable Gain Equalization Using a Mach-Zehnder Optical Filter in Multistage Fiber Amplifiers," *IEEE Phot. Technol. Letts.*, 3, 718–720, (1991); F. Su, R. Olshansky, G. Joyce, D. A. Smith and J. E. Baran, "Gain Equalization in Multiwavelength Lightwave Systems Using Acoustooptic Tunable Filters," *IEEE Phot. Technol. Letts.*, 4,269–271, (1992); and F. Khaleghi, M. Kavehrad and C. Barnard, "Tunable Coherent Optical Transversal EDFA Gain Equalization," *J. Lightwave Technol.*, 13,581–587, (1995), which are hereby incorporated by example. This approach requires a large amount of hardware, including a spectrometer, to be attached to each EDFA.

An example as disclosed in U.S. Pat. No. 5,155,780 to Zirngible, of a method to equalize the optical power in a network is an optical limiting amplifier. In the optical limiting amplifier, the input optical signal is divided into two signals. One signal is the input signal of the optical amplifier. The other signal is passed through a saturable absorber. The signal from the saturable absorber is fed back into the optical amplifier via the output of the optical amplifier. The output signal from the saturable absorber varies at a rate which is greater than the variation between the input signal and the saturable absorber, and thus forms a negative feedback loop to the optical amplifier.

For the above systems incorporating a saturable absorber, as the optical signal into the amplifier increases, the feedback signal from the saturable absorber increases at a faster rate. As the feedback signal increases in intensity, the gain saturation of the optical amplifier is increased, and the gain of the amplifier is proportionally reduced. Thus, the amplifier has an output of constant power regardless of the input strength of the input signal.

However, this method of achieving constant power from an optical amplifier has the drawback of requiring a negative feedback signal. The negative feedback signal adds complexity to the system, and requires directional couplers to be inserted into the system. This method of power equalization also has a drawback that it is limited to functioning at a single wavelength.

Another device as disclosed in U.S. Pat. No. 6,104,848 to Loyohara, et al., which can equalize optical signals consists of multiple light sources each generating its own wavelength signal, and each with its own amplifier. The outputs of each amplifier are multiplexed into an optical transmission line and a small portion of the signal is coupled from the transmission line to form a feedback loop. In the feedback loop, the power at each frequency in the optical signal is measured separately, and the measured power level of each signal controls the gain of that signal's respective amplifier. A control unit then functions to separately adjust the gain of each amplifier at each light source so that the power at each frequency in the optical signal is equalized. One drawback of this system is that each frequency in the optical signal must be measured and adjusted separately, which requires a complicated system.

Another example, as disclosed in U.S. Pat. No. 5,812,710 to Sugaya, of a device that equalizes two signals of a multi-wavelength signal consists of a variable optical attenuator, an optical fiber amplifier, a light source to pump the amplifier, and a control unit which receives a small portion of the output signal from the amplifier. The control unit controls both the attenuating unit and the power of the pump light source. The control unit receives a feedback signal from the output of the optical amplifier and measures the intensity of the two wavelengths to be equalized. The control unit then adjusts the attenuation of the variable optical attenuator, and adjusts the power of the pump light source driving the optical amplifier. With suitable adjustments to the attenuator and pump light, the power of the two wavelengths can be equalized. The drawbacks with this system include the inability to equalize more than two wavelengths, and the need for a feedback signal from the output of the amplifier.

SUMMARY OF THE INVENTION

An object of the invention is to solve at least the above problems and/or disadvantages and to provide at least the advantages described hereinafter.

Another object of the invention is to provide methods and apparatus to equalize the power of at least one wavelength (or frequency) in a multi-wavelength optical signal.

In order to achieve at least the above-described objects of the present invention in whole or in part, there is provided an optical power equalizer including a filter with separably variable wavelength dependent transmission coefficients, wherein each coefficient decreases with increasing power for each respective wavelength coupled or input to the equalizer. Thus, the highest power wavelength output from an EDFA will be filtered more than the lower power wavelengths, making the output power from the EDFA more evenly distributed among the wavelengths. An example of a device with this power-dependent transmission function is a power equalizer based upon the photo-refractive effect. Such an equalizer can be placed downstream from each EDFA after an optical isolator without destabilizing the optical network so that no changes need to be made to the EDFA or to the other components in the system. By placing the equalizer after the isolator, reflections from the equalizer will not degrade the EDFA. The equalizer is not sensitive to reflections from down stream, so additional isolators are not necessary.

To further achieve the above-described objects of the present invention in a whole or in parts, there is provided an apparatus including an optical cavity adapted to receive and transmit an optical signal with a photo-reactive medium disposed within the optical cavity, wherein the photo-reactive medium is configured to reversibly form a diffraction grating adapted to scatter at least a portion of the optical signal in proportion to the intensity of the optical signal.

To further achieve the above-described objects of the present invention in a whole or in parts, there is provided a power equalizer including an optical cavity adapted to receive an optical signal containing a plurality of wavelengths; and a photo-refractive medium disposed within said optical cavity, wherein the optical cavity is configured to filter higher power wavelengths more than lower power wavelengths, thereby substantially equalizing power of at least a portion of said plurality of wavelengths.

To further achieve the above-described objects of the present invention in a whole or in parts, there is provided an apparatus to equalize power in an optical signal including an optical cavity for receiving an optical signal having at least one wavelength, wherein the optical cavity has a finesse optically matched to the optical signal, and a photo-reactive medium disposed within the optical cavity, wherein the photo-reactive medium and the optical cavity are configured to form a diffraction grating in response to the optical signal which reduces the intensity of at least one wavelength in the optical signal.

To further achieve the above-described objects of the present invention in a whole or in parts, there is provided a method for equalizing the power of a multi-wavelength optical signal including the steps of directing an optical signal into a reflective cavity containing a photo-reactive material, reversibly forming a diffraction grating within the reflective cavity, and scattering at least one frequency of the optical signal by passing the optical signal through the reversibly formed diffraction grating.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The input signal introduced into the power equalizer according to the invention is split into three beams so that the first two beams are co-linear counter-propagating beams within the photo-reactive medium. However, dividing and recombining the beams as described is a conceptual simplification, and such a device would be unwieldy. The input signal can be any electromagnetic signal and preferably optical signals that transmit in optical fibers and more preferably optical radiation used in telecommunications, which can include 1.3 $\mu$m and 1.5 $\mu$m optical radiation.

The optical power equalizer according to one embodiment of the invention is a filter whose transmission coefficient decreases with increasing power at each wavelength coupled into it, and is based upon an optical cavity containing a photo-reactive medium. This power-dependent transmission function is achieved with a photo-refractive Fabry-Perot cavity. The counter-propagating beams are created by reflections within the Fabry-Perot cavity. The counter-propagating beams create a grating whose period is determined by the wavelength and whose amplitude depends on the power in the incident beam. The grating is a phase grating with the same period and with amplitude proportional to the input power and is created by the photo-refractive effect in the photo-refractive medium. The third co-linear counter-propagating beam is Bragg diffracted by the grating. The diffraction of the third beam is proportional to the amplitude of the phase grating. This is exactly the property needed for adaptive equalization, where the device adapts itself to attenuate higher power input wavelengths more than lower power input wavelengths. The device can also be used as a power limiter for a single wavelength.

A photo-reactive medium is a material where one or more of its optical properties, such as its index of refraction, its transparency, its propagation constant, or ionization is altered through an interaction with light. For the case of GaAs, for example, the photo-refractive nonlinearity arises because of a coupling between the optical intensity, mobile and fixed charge carriers, and an induced space-charge field. This space-charge field gives rise to the nonlinearity through the electro-optic effect.

Figure 1:
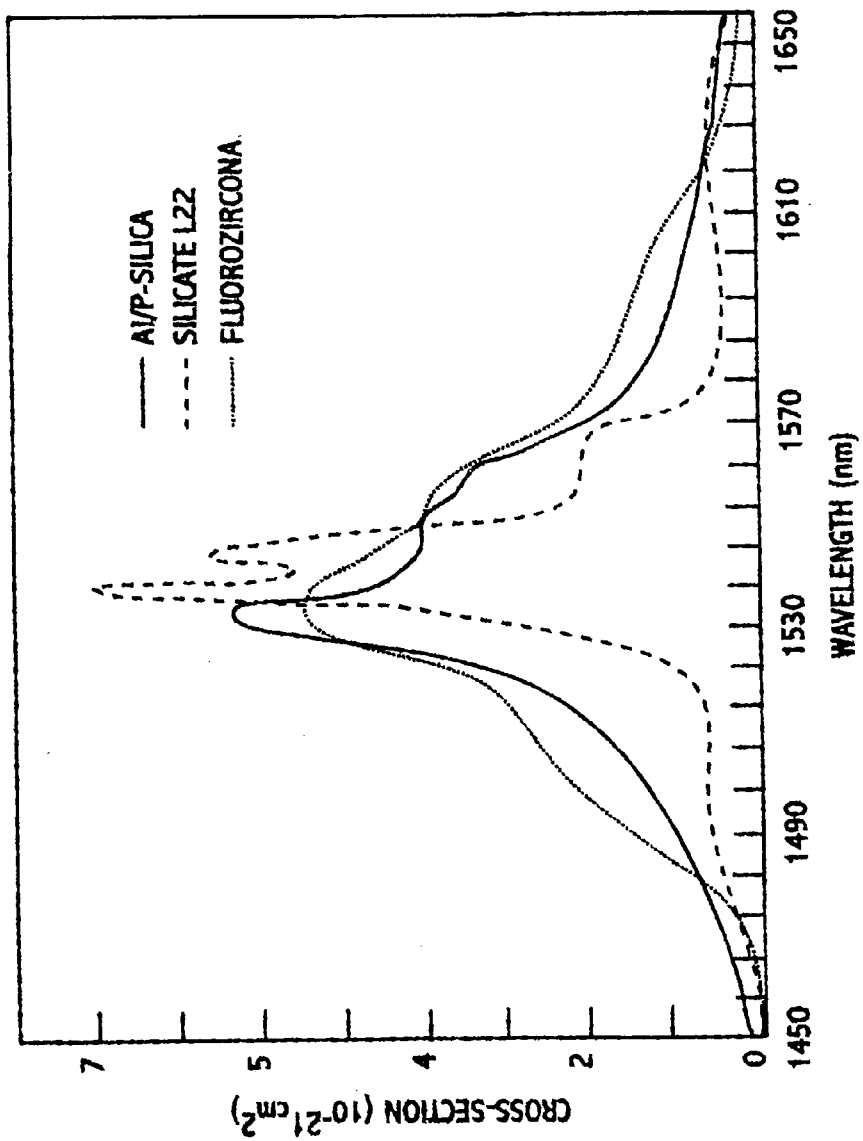
FIG. 1 shows the gain distribution of an erbium doped fiber optic amplifier as a function of input wavelength.
Figure 2A:
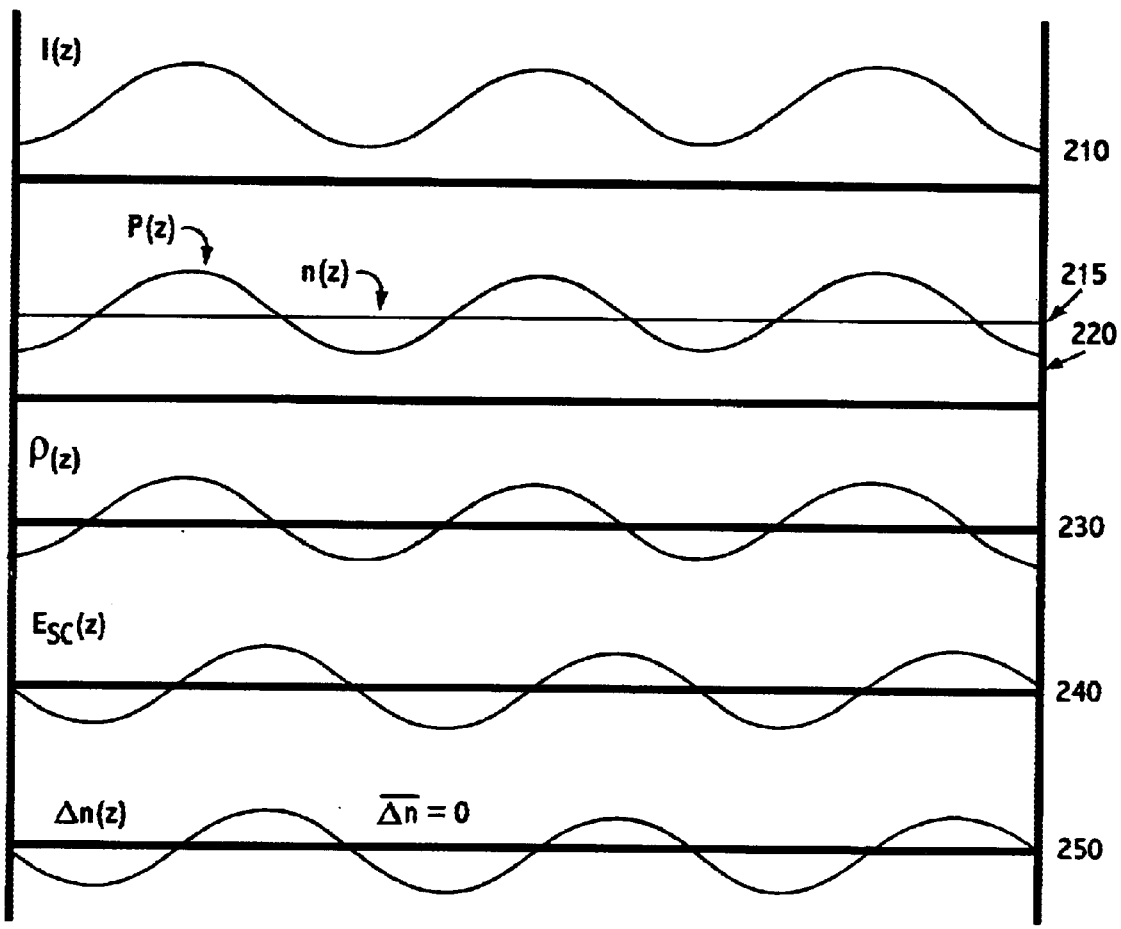
FIG. 2A shows the relationship in a material between the various quantities associated with the photo-refractive effect.

The relationship between coupling between the optical intensity, mobile and fixed charge carriers, and an induced space-charge field is illustrated in FIG. 2A for a photo-refractive material. Curve 210 is the light intensity I(z) inside the Fabry-Perot device (standing wave pattern). Curve 215 shows the mobile charge density n(z), following photo-ionization by the light of Curve 210. Curve 220 shows the fixed charge p(z) density following photo-ionization by the light of Curve 210. Curve 230 shows the resulting charge density ρ(z) which couples to the resultant change in refractive index. Curve 240 shows the space-charge field $E_{sc}(z)$ arising from the, charge density. Finally, curve 250 shows the resultant change in refractive index Δn(z) which yields a photo-refractive Bragg grating. Note, that for the photo-refractive nonlinearity, the average change in the refractive index is zero, that is, $\overline{\Delta n}=0$. This is a preferred result as will be discussed below.

Figure 2B:
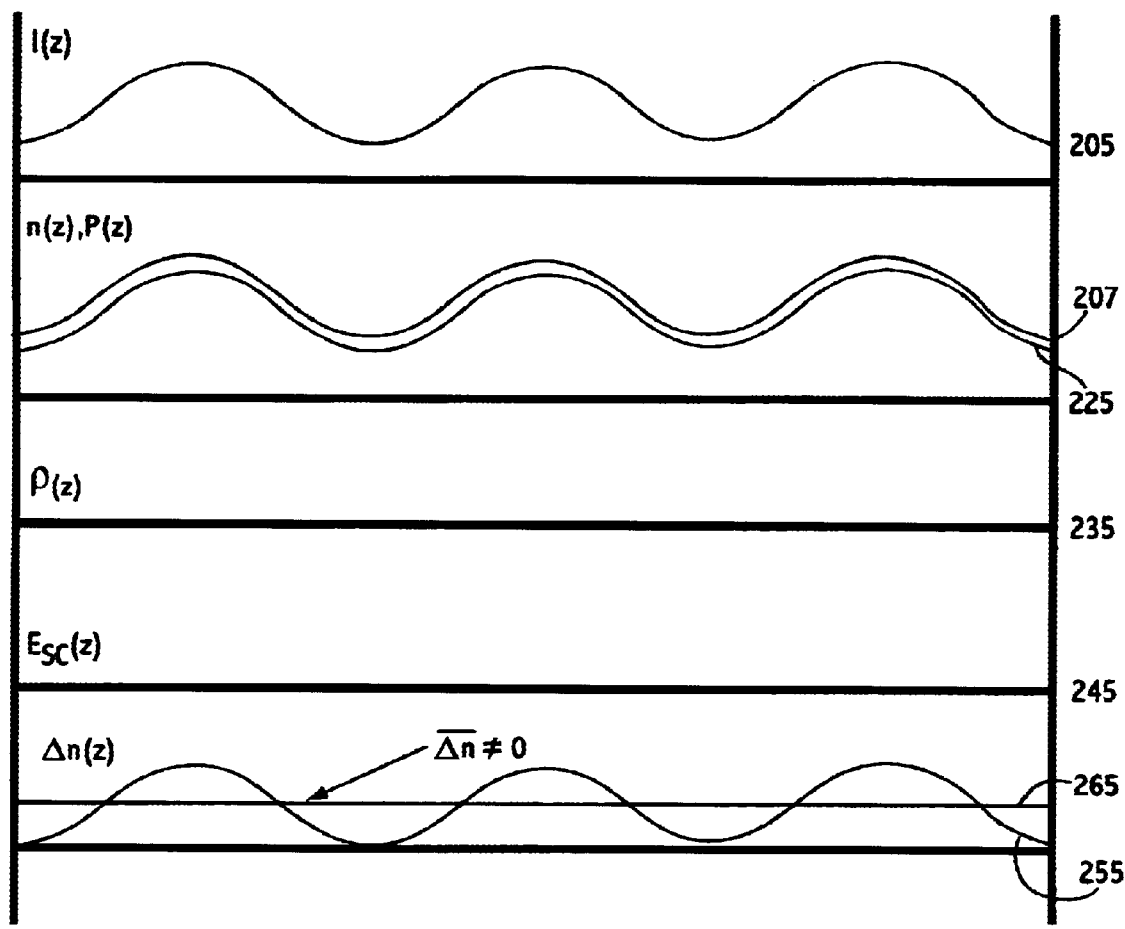
FIG. 2B shows the relationship in a material between the various quantities associated with the photo-refractive effect for the case of photorefractive medium.
Figure 2C:
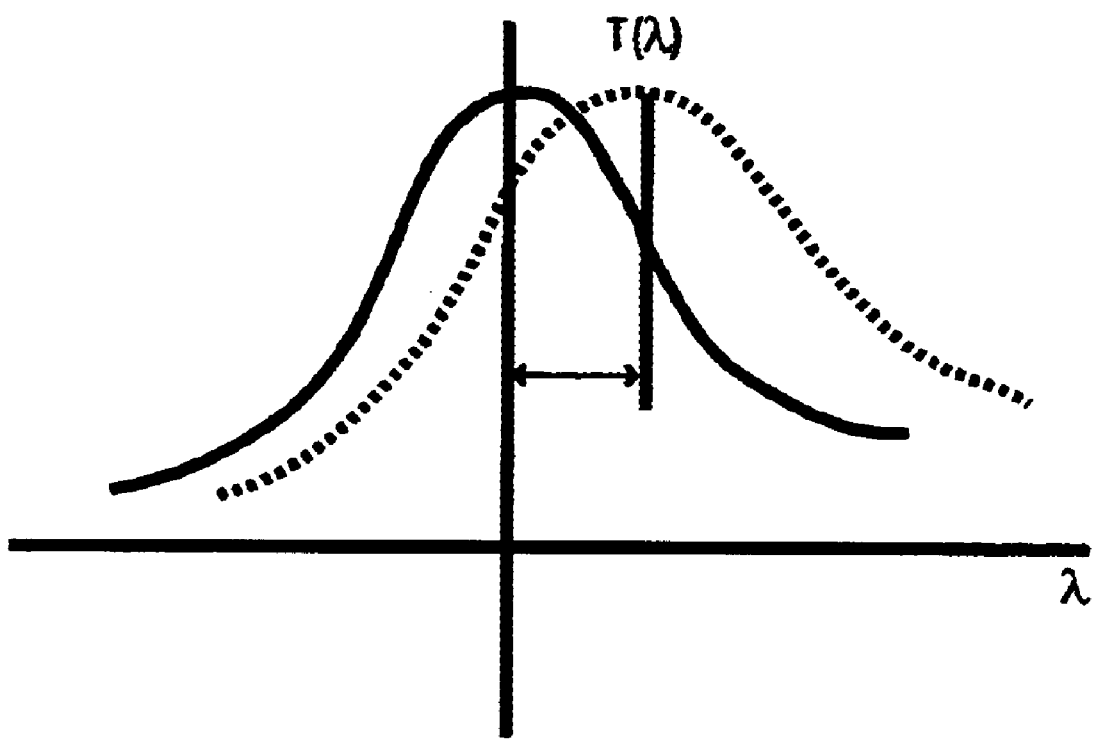
FIG. 2C shows the non-resonant contribution to the equalizer at all wavelengths.

FIG. 2B shows the relationship between the various quantities associated with the photo-refractive effect for the case of a Kerr medium as the cavity material. Curve 205 is the light intensity I(z) inside the Fabry-Perot device (standing wave pattern). Curve 207 shows the fixed charge density n(z), following photo-ionization by the light of curve 205. Curve 225 shows mobile charge p(z) density following photo-ionization by the light of curve 205. Curve 235 shows the resulting charge density ρ(z). Curve 245 shows the space-charge field arising from the charge density $E_{sc}(z)$. Finally, curve 255 shows the resultant charge in refractive index Δn(z) which is the photo-refractive Bragg grating. For the Kerr material, a grating is induced, but $\overline{\Delta n} \neq 0$, curve 265, resulting in a shift of the Fabry-Perot transmission peak as illustrated in FIG. 2C. Such a shift results in crosstalk between signal wavelengths and is undesirable.

The photo-refractive material of FIG. 17A is preferred over the Kerr medium of FIG. 2B because it is capable of yielding but $\overline{\Delta n}=0$ or nearly 0 as opposed to a non-zero $\Delta n$.

FIG. 2C shows the crosstalk between WDM channels due to non-resonant contributions to the equalizer at all wavelengths.

Figure 16:
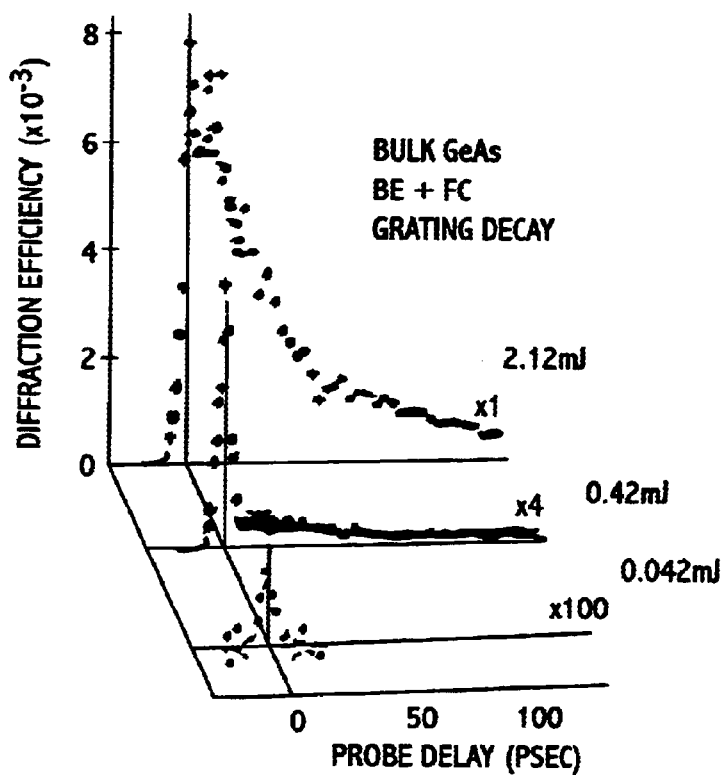
FIG. 16 shows grating decay rates for bulk GaAs BE and FC formed gratings in the low fluence regime at three different fluences.
Figure 17:
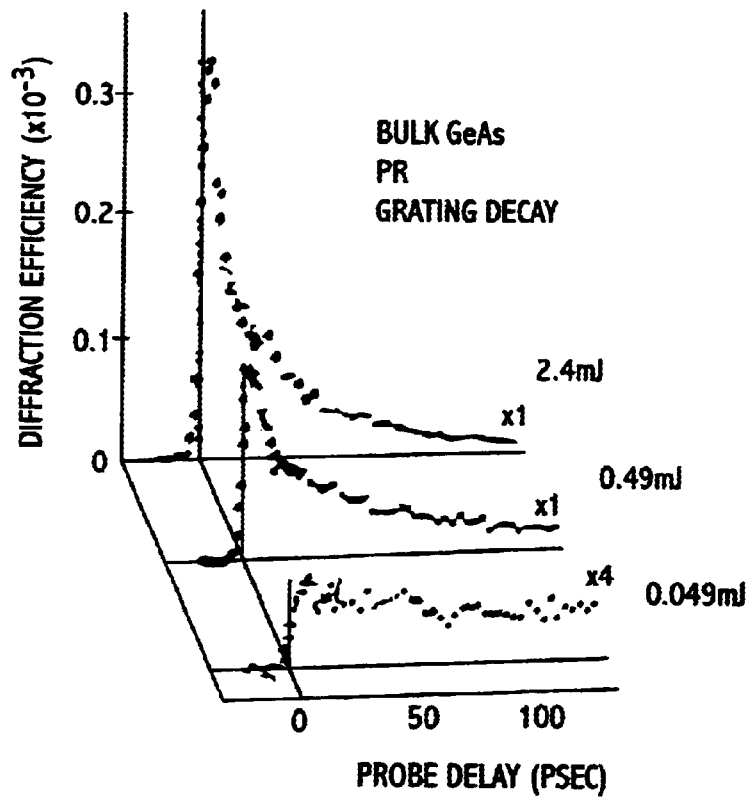
FIG. 17 shows grating decay rates for bulk GaAs PR formed gratings in the high fluence regime at three different fluences.

FIGS. 16 and 17 show grating decay rates for bulk GaAs at different fluence levels for BE and FC, and PR grating ratings, respectively. Both Figures are reproduced from W. A. Schroeder et al. Opt. Lett. 16, 159 (1991), which is hereby incorporated by reference.

The effect shown in FIG. 2A can be achieved with co-linear, counter-propagating beams. Beams are co-linear counter-propagating when they are propagating in opposite directions along the same path, superimposed upon one another. A third beam is then superimposed upon the co-linear counter-propagating beams. As used herein, the terms "optical," "signal," "optical signal," "beam," "light," and the like denote the energy propagating through the system or network and includes electromagnetic energy of any frequency, energy level, or wavelength within or outside of the visible range of light. Additionally, "a frequency," "a wavelength," "a wavenumber" and the like, refer to a bandwidth of electromagnetic energy that is relatively narrow with respect to the bandwidth of the electromagnetic energies that can pass through the respective system.

Any method to create multiple co-linear counter-propagating beams (preferably three) from a single beam and then to re-combine those beams back into a single beam would form a suitable beam splitter for the power equalizer according to the invention. One example involves two partially reflective plane mirrors arranged parallel to one another similar to a Fabry-Perot cavity such as a Fabry-Perot interferometer or Fabry-Perot etalon. A Fabry-Perot interferometer and a Fabry-Perot etalon are two specific examples of a Fabry-Perot cavity. The first two co-linear counter-propagating beams interact with the photo-reactive medium to create an optical grating with a grating period determined by the wavelength of the incident beam. The third beam then interacts with the grating.

"Bragg scattering" occurs when light of certain wavelengths interacts with a grating made of periodic changes in the index of refraction. When the spacing of the grating has the proper correspondence with the wavelength of light, the light can resonate with the grating and undergo "Bragg scattering." Bragg scattering is similar to, but not the same as diffraction from a diffraction grating. However, there are substantial similarities between Bragg scattering, scattering from a periodic structure in general and diffraction from a grating. Thus, the terms "grating," "optical grating," "diffraction grating," and "scattering grating" are and are used interchangeably herein and "Bragg grating" refers to an optical structure which can exhibit Bragg scattering. The amplitude of the grating depends on the power of the incident beam. Because the Bragg grating has a period substantially the same as the wavelength of the light that created it, it diffracts the third beam that co-propagates with the first beam.

The larger the grating amplitude, the more that this third beam is diffracted by the grating. Even though "scattering," "diffraction," "attenuation," and "filtering" are not exactly the same physical process, the end result of each can be to reduce the power of an optical signal, and the terms are therefore used interchangeably herein. Thus, for purposes herein, the power, intensity, or energy of an optical signal is said to be "scattered," "diffracted," "attenuated," "filtered," "reduced" or "redirected" by interacting with or passing through a periodic structure such as a Bragg grating, diffraction grating, optical grating, and the like arising from the photo-refractive effect. Since the amplitude of the photo-refractive grating created in the power equalizer is approximately proportional to the power of the input beam, the third beam is attenuated more for higher input powers. This third beam, when it leaves the photo-refractive medium, is the output signal of the power equalizer, and its power is attenuated more (through Bragg scattering) if its input power is greater, and less if its power is lower.

As used herein, "photo-reactive" means any optically active material which changes a physical characteristic in response to light and preferably a physical characteristic that effects scattering as defined herein. Such changes can include changes in index of refraction, changes in polarizing ability, changes in transparency or opacity, changes in frequency or polarization dispersion, changes in reflectivity, changes in absorption, etc. "photo-refractive" is a special case of photo-reactive where the material's index of refraction changes in response to light.

In the quasi-CW (continuous wave) regime, different incident beam intensities have different build-up times for localized changes in the index of refraction which form the grating, rather than a grating amplitude that is proportional to the temporally-averaged incident signal as is desired for power equalization. See P. Yeh, Introduction to Photorefractive Nonlinear Optics, Wiley, (New York, 1993), which is hereby incorporated by reference. However, various materials have been reported that exhibit a dynamic photo-refractive effect that is ideally suited for application in the power equalizer.

A material is a dynamic photo-refractive material when an induced change of index of refraction is proportional to the gradient of the intensity of the optical signal inducing the change of index of refraction. For example, in bulk gallium arsenide (GaAs) at low fluences (<200 $\mu$J/cm$^2$), a photo-refractive grating can be established through the single-photon ionization of EL2 defects, where "fluence" is the amount of energy in the cross-section of the input beam. For example, see W. A. Schroeder et al. Opt. Lett. 16, 159 (1991), which is hereby incorporated by reference. The EL2 defects are photo-ionized by a single-photon absorption process. The result is a mobile/fixed charge pair. The mobile charge is free to diffuse, whereas the fixed charge maintains its original distribution. As a result, a space-charge field is induced, and a photo-refractive index grating is induced through the electro-optic effect. This photo-refractive grating forms on a time scale less than approximately 5 ps (pico-seconds) and decays at the electron/EL2 recombination rate (~1 ns (nano-second)). In this low-fluence regime, the EL2 defects remain mostly un-ionized. Thus, for a 10 Gbit/s data rate, the amplitude of the grating will be proportional to an exponentially-weighted average of the last 10 (=10 Gbit/s*1 ns) bits in the data stream. Assuming 10 Gbit/s data rate, 4 WDM wavelengths, a fiber optic core mode radius of 4 $\mu$m (microns), and less than 100 mW (milli-Watt) average power in the system, the fluence is calculated as follows:

$$F = \frac{(100 \; mW)(10^{-10} s)}{\pi (4 \times 10^{-4} cm)^2} \leq 20 \; \mu J \qquad \text{Eq. 1}$$

Thus, the system is well within the low fluence regime ensuring low-crosstalk, well-behaved grating formation and fast grating decay rates. Typical fluence levels are expected to be less than 2 $\mu J$ and are influenced by diffraction between the fiber and equalizer and the number of wavelengths in the WDM signal. This number may be varied by appropriately engineering the recombination lifetime of the electrons that are the mobile constituents of the photo-refractive grating.

In the "low fluence regime" where energy flux is defined herein to be less than or equal to about 200 $\mu J$ (micro-Joules), the free carrier effects are negligible and grating formation time is on the order of about 5 PS (pico-seconds). Grating formation is dominated by single photon ionization of the EL2 level. The EL2s are not completely ionized and the grating diffraction efficiency is proportional to fluence. Above the low fluence regime, a PR grating is formed which is a result of contributions from EL2 ionization and free-carrier induced Dember space-charge field. Above the low fluence regime, there is a free-carrier grating formed with about an order of magnitude greater diffraction efficiency.

The finesse of the cavity can be selected such that free-carrier formation is low, and the photo-reactive effect within the medium stays in the linear regime for typical fluences. However, the finesse can not be set too low, otherwise the signal does not reflect within the cavity sufficiently to form a grating.

The integration time, i.e., the time over which carriers are accumulated during their excitation is limited by the grating decay time, which in this example is about 1 nS or 10 bit periods. It is advantageous for the power equalizer to respond to the average power in a WDM channel. To effect an appropriate integration time, certain protocols for statistically known duty cycles and bit stuffing techniques to limit the number of 1's or 0's in a row can be used. Additionally, the grating decay time can be engineered during design or manufacture of the power equalizer.

Photo-refractive materials besides GaAs include lithium niobate, lithium niobate doped with iron, zinc telluride doped with vanadium, or and zinc telluride doped with vanadium and manganese and virtually all III–V and II–VI (polar) semiconductors. Zinc telluride doped with vanadium has been found to exhibit strong photo-refractive characteristics at wavelengths from about 0.6 $\mu m$ to about 1.3 $\mu m$ (microns). Still other photo-refractive materials include certain polymers such as the composite polymer PVK:PDCST-:BBP:$C_{60}$.

When an optical signal interacts with a photo-refractive material within a reflective cavity of suitable dimensions, the signal causes a photo-refractive Bragg grating to form. Because the signal gives rise to the Bragg grating, the signal is said to "activate," "initiate," or "form," the grating. The grating is in existence only as long as the signal which initiated it is present. Because the continued existence of the grating after it is initiated depends on the presence of the optical signal, the signal is said to "sustain," "maintain," or "support," the grating after activation. During grating initiation, and while the optical signal sustains the grating, the amplitude of the grating depends on the intensity or power of the optical signal. This dependence continues for the life of the grating, with the amplitude of the grating increasing or decreasing as the strength of the optical signal increases or decreases. Because the grating amplitude proportionally tracks the optical signal strength, the grating amplitude is said to "dynamically adapt" to the signal amplitude.

Dividing and recombining the beams as described can be accomplished by passing the beam through a Fabry-Perot cavity. When directed into a Fabry-Perot cavity, the input signal will reflect back and forth between the Fabry-Perot reflectors, equivalent to creating co-liner counter-propagating beams. A standing wave will be formed by the beam in the photo-reactive medium when the reflectors have the appropriate separation distance relative to the wavelength of the light. Hence, with a suitable reflector separation, a single or a number of wavelengths within a multi-wavelength beam can be selected to form standing waves within the cavity. The standing wave creates a phase-shifted grating in the photo-reactive material as seen in FIG. 2 that then diffracts or scatters the beam which has reflected off of the input reflector, which now plays the role of the third beam. For the case where the photo-reactive material is photo-refractive, the grating will be a refractive grating with periodic and localized changes in the index of refraction.

In general, a Fabry-Perot cavity will transmit only wavelengths which fall on a Fabry-Perot resonant peak. A Fabry-Perot resonance peak is where a wavelength is fully transmitted through the cavity because the reflectors are an integer number of wavelengths apart. Thus, a Fabry-Perot cavity will substantially transmit any wavelength which forms a standing wave between the reflectors, and any wavelength for which an integer number of half-wavelengths fits between the reflectors forms a standing wave.

A Fabry-Perot cavity can be designed to have one or more resonances in any particular wavelength band. These Fabry-Perot resonances appear as transmission peaks when the transmission of the Fabry-Perot device is plotted against wavelength.

The distance between the transmission peaks in wavelength numbers is defined as the "free spectral range" and is a function of the distance between the reflectors. The ratio of the free spectral range divided by the full width of a transmission peak as measured at half the maximum height of the peak is defined as the "finesse" of the Fabry-Perot device. The finesse is also sometime referred to as the "Q" or "quality" of the resonant cavity, and has the mechanical analogy of how long it takes for the vibrations of an un-driven oscillator to damp out.

Where GaAs is the material within the Fabry-Perot device, it is important to maintain the excitation level of the dynamic photo-refractive medium comprising the equalizer below the low-fluence threshold described above. This is because for excitation levels above the threshold, free-carrier nonlinear effects begin to dominate over the photo-refractive nonlinearity. Unlike for the photo-refractive effect, the spatial average of the free-carrier nonlinearity is non-zero, and will give rise to a shift of all Fabry-Perot resonances in the device, resulting in crosstalk between the wavelength division multiplexed channels.

Because the photo-refractive nonlinearity has a spatial average of zero, this type of crosstalk will not occur in a photo-refractive material such as GaAs. At data rate and recombination times appropriate to approximately 10 Gbit/s, the EDFA is operating near its output saturation level of approximately 50 mW (17 dBm) with a beam spot size of approximately 10 $\mu m$ at the power equalizer. Under such conditions, the fluence per bit period with the equalizer located at the EDFA output is given by the following equation:

$$F_{bit} = (50 \; mW)(10^{-10} \; s)/(\pi(10 \; \mu m/2)^2) = 6.4 \; \mu J/cm^2 \qquad \text{Eq. 2}$$

which is well within the low-fluence regime. Even lower fluences are possible by placing the equalizer at the EDFA input rather than output, or by increasing the spot size of the beam directed into the power equalizer.

Described in terms of a symmetric Fabry-Perot cavity rather than as a four-wave mixing process, the device transmission coefficient is input power dependent. At low input power, the Fabry-Perot cavity is in the linear regime. Its transmission coefficient as a function of wavenumber will have peaks of unity transmission which correspond to a spacing between the reflecting surfaces of the Fabry-Perot cavity of an integer number of wavelengths.

At these peaks, the phase shifts due to wave propagation across the cavity and those due to reflections at the mirrors exactly add to give substantially perfect constructive interference of the transmitted wave and substantially perfect destructive interference of the reflected wave. At higher input powers, a standing wave in the photo-reactive medium-filled cavity creates a stationary phase grating that Bragg diffracts the light. In other words, a photo-refractive standing wave in the cavity creates a stationary phase grating that Bragg diffracts the light. Bragg scattering will spoil the constructive interference of the transmitted wave, and the transmission coefficient will decrease because of the grating. As the input power increases, the amplitude of the grating increases and the transmission at the Fabry-Perot resonant peak further decreases. This yields the power-dependent transmission coefficient of the device.

A condition for equalization is that the wavelength is near a transmission or resonant peak of the linear Fabry-Perot cavity. A wavelength that is not near a transmission peak may be anti-equalized for certain polarizations. That is, the transmission is higher at higher input powers. To maximize the wavelength range over which power equalization may occur, the Fabry-Perot transmission peaks should be wide, or equivalently, the Fabry-Perot device should have a low finesse. This is illustrated numerically in FIG. 3.

To equalize the power of different wavelengths in a multi-wavelength signal, the Fabry-Perot device must be designed so that each wavelength falls near a different transmission peak so that each wavelength, if it were the only input, would have its power attenuated as its input power is increased. This is possible if the wavelengths have roughly equal spacing. Each has to fall within an allowable range determined by the finesse of the Fabry-Perot cavity. Wavelength division multiplex systems that follows standards set by the International Telecommunications Union (ITU) use a set of wavelengths that are equally spaced in frequency. Adherence to these wavelengths is generally stricter than necessary for the power equalizer to at least partially equalize the power between wavelengths in a WDM signal.

Each wavelength creates its own grating in the photo-reactive medium with its own period. A particular wavelength is Bragg diffracted by the grating created by that particular wavelength because the phase-matching condition is substantially satisfied. A grating created by a first wavelength does not diffract a second wavelength, nor does the second wavelength's grating diffract the other wavelengths because the phase-matching condition cannot be satisfied for a beam of one wavelength interacting with the grating created by another wavelength. This leads to a desirable property of the equalizer: multiple wavelengths are separately and simultaneously equalized without having to disperse the wavelengths, either for the purpose of measuring the power distribution or of selectively attenuating the power at each wavelength.

Moreover, the equalizer does not disperse the wavelengths because the Bragg scattering is either in the forward or backward directions. Multiple wavelength input signals therefore can be coupled directly from a fiber to the equalizer and back into another fiber with standard fiber coupling techniques. Additionally, an optical isolator can be incorporated into the system such as to protect the EDFA from light scattered from the equalizer.

In some cases, it may be advantageous to couple the scattered light out of the system, for example, with a optical circulator into a beam dump to prevent the scattered light from interfering with other components in the system. Any means suitable to remove the scattered light energy from the system can be used to prevent scattered light from interfering with other components in the network.

The properties of the embodiments of the invention just described are useful because they greatly simplify the implementation of the power equalizer. But the embodiments have other properties that have important network implications. For example, the power equalizer according to the invention is scalable to a network with a larger number of wavelengths. Adding a new wavelength to the network is trivial as long as it falls near a transmission peak of the Fabry-Perot cavity because the same Fabry-Perot device can handle these additional wavelengths with no modification to the device or its couplers.

Additionally, the device according to the invention can be made tunable so that its free spectral range, and its range of transmission peaks can be variable. The ultimate limitation on the number of wavelengths is determined by the saturation of the photo-reactive effect in the medium.

Further, the power equalizer according to the invention will operate properly even as the number of wavelengths is changing. Should the number of wavelengths suddenly decrease because of a network reconfiguration (e.g., a wavelength is re-routed), the output power of the EDFA at each of the remaining wavelengths will increase. The power equalizer will compensate for this increase in output power by attenuating more than it did before reconfiguration because the power at each wavelength is now greater.

The equalizer can be viewed as functioning to bring the output of each wavelength to a power determined by the material properties and device geometry of the equalizer. This leads to another property of the invention of importance to the network: the power equalizer does not need a power level standard or reference that would most likely waste a dedicated wavelength channel. Thus, the power equalizer does not reduce bandwidth.

Furthermore, it is important to note that the equalizer according to the invention is essentially a passive device and can operate with no input power except possibly for temperature control to keep the optical path length of the Fabry-Perot cavity at its design value. The power equalizer can also rely on thermal expansion to compensate for manufacturing variations in the cavity length.

In order to achieve the above-described objects of the invention there is provided an optical cavity, which receives an input signal, reflects that input signal internally within the optical cavity, and outputs the optical signal. Within the optical cavity is a photo-refractive medium. The photo-refractive medium is capable of forming a Bragg diffraction grating with a period determined by and equal to the wavelength of the input signal. The amplitude of the Bragg diffraction grating is determined by the intensity of the input signal. The photo-refractive medium has the ability to form multiple Bragg diffraction gratings, one for each wavelength of light traveling through the refractive medium. The Bragg diffraction gratings thereby formed selectively scatter each wavelength of light in proportion to the intensity of that wavelength of light.

The invention will now be discussed in more detail with respect to particular embodiments shown in the drawings.

Figure 4:
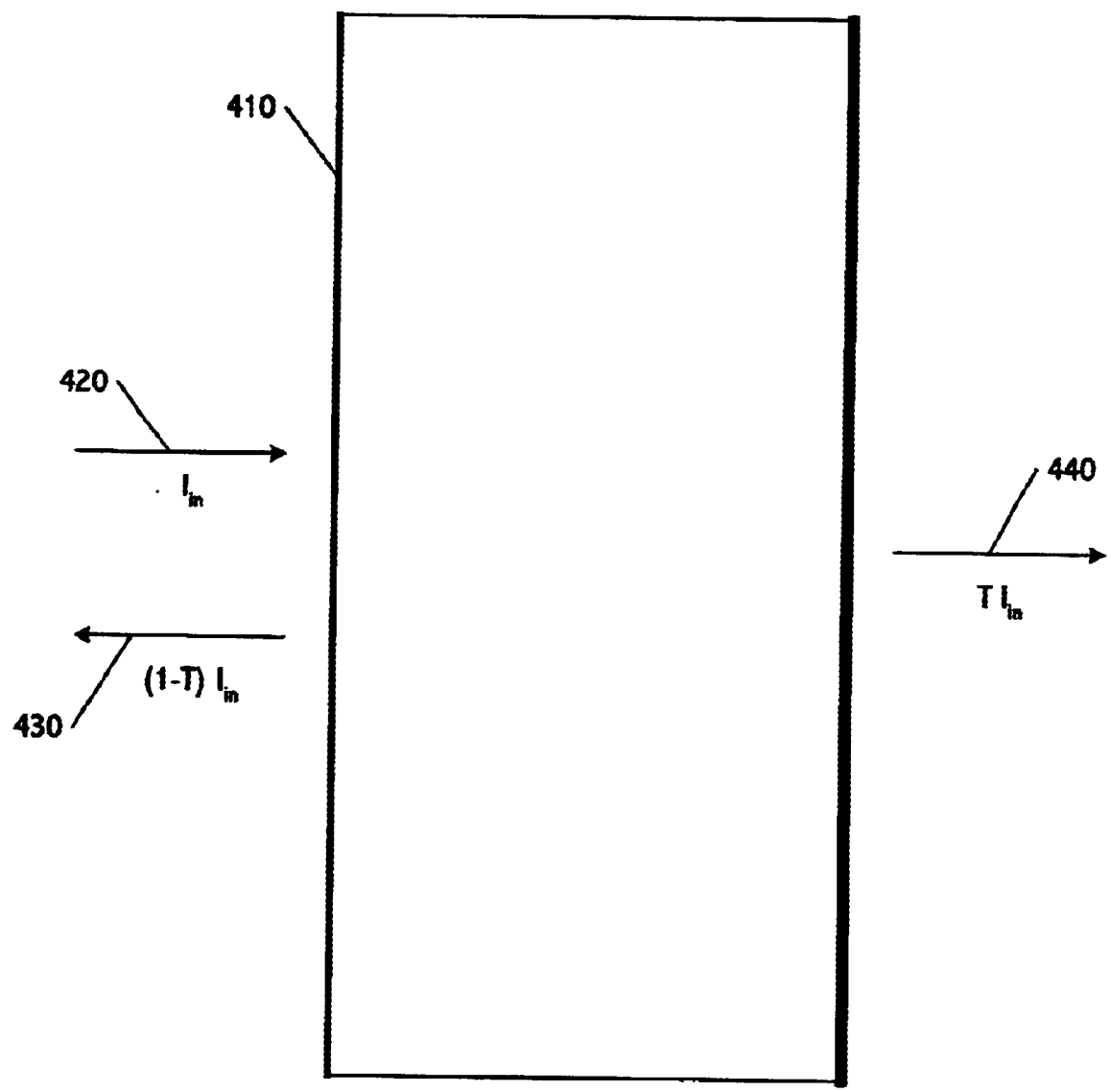
FIG. 4 is a schematic of the power equalizer.

The geometry of one embodiment of the power equalizer is shown in FIG. 4. In the example shown in FIG. 4, the power equalizer consists of a Fabry-Perot cavity filled with a photo-refractive medium 410, which receives incident light 420, and reflects 430, part of the incident light 420, and transmits 440, part of the incident light. The input beam will bounce back and forth between the Fabry-Perot reflectors, equivalent to setting up the first two beams. The standing wave creates a phase-shifted index grating in the photo-refractive material that then diffracts the beam, which now plays the role of the third beam. In other words, the incident light creates a standing wave in the Fabry-Perot cavity and this standing wave, in turn, creates an index modulation through the photo-refractive effect that alters the transmission coefficient T. Because the Fabry-Perot cavity is lossless, the reflection coefficient is 1-T.

Figure 5:
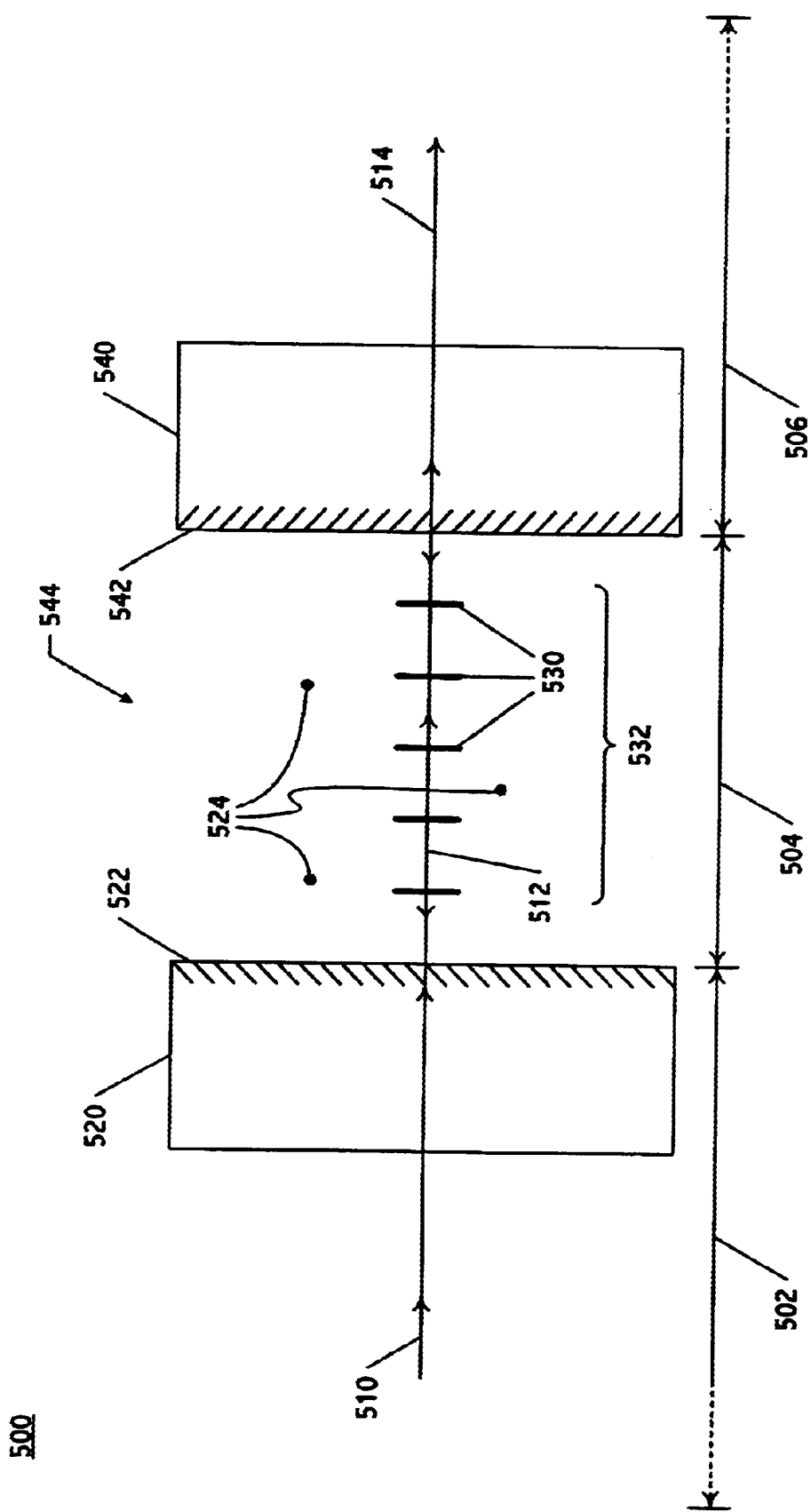
FIG. 5 is a schematic diagram of an apparatus for equalizing the power of at least one frequency in a multi-wavelength optical signal according to one embodiment of the invention.

Referring to FIG. 5, an apparatus 500 for equalizing the power of at least one frequency in a multi-wavelength optical signal according to one embodiment is shown. An optical path through the power equalizer 500, is divided into three segments 502, 504, 506. The first segment 502 corresponds to an input beam or signal 510 to the power equalizer 500. The second segment 504 corresponds to an optical cavity 544 of the power equalizer 500. The third segment 506 corresponds to an output beam or signal 514 of the power equalizer 500.

According to this embodiment, the second segment 504 lies between reflective surfaces 522 and 542 of the optical cavity 544. That is, the optical cavity 544 is bounded by two transparent plates 520 and 540 with partially reflective coatings 522 and 542. The transparent plates 520 and 540 are arranged relative to each other such that the reflective surfaces 522 and 542 are substantially parallel.

The plates 520 and 540 can be constructed of any suitably transparent material. Examples of suitable materials include various types of glasses, fused quartz, semiconductors, and plastics.

The reflective surfaces 522 and 542 can be formed by depositing a reflective material on the surfaces of the plates 520 and 540. Examples of suitable reflective coatings include aluminum, silver, gold, platinum, etc., deposited to a thickness suitable for partial transmission and partial reflection of the input signal 510. Reflective materials can also include dielectric coatings and photonic bandgap materials that are engineered to reflect light at particular wavelengths.

The interior of the optical cavity 544, which corresponds to segment 504, is preferably filled with a photo-reactive medium 524, such as gallium arsenide or zinc telluride. Reference numeral 512 indicates the optical beam within the optical cavity 544, and transiting the photo-reactive medium 524. Localized photo-induced changes in the index of refraction, some of which are represented by reference numeral 530, form a diffraction grating 532 where the photo-reactive material is photo-refractive.

For example, where the photo-reactive material is GaAs, deep electron energy levels near mid-gap, such as EL2, can be photo-ionized with approximately 1.55 $\mu$m light to give rise to the photo-refractive effect. Optical waveguide and material growth technologies in GaAs are well developed so an integrated optics implementation of the equalizer should be possible. Gallium Arsenide has been utilized as the photo-reactive medium in this illustration. However, any material which displays suitable photo-refractive properties or other photo-reactive characteristics which can cause a Bragg diffraction grating to form in proportion to the intensity of the input beam with the characteristic that its spatial average is zero would be a satisfactory material for the optical cavity.

In operation, the power equalizer 500 receives an input beam or signal 510. The input beam 510 is transmitted through the first optical plate 520, through the partially reflective coating 522, and into the optical cavity 544 and photo-reactive material 524. The beam 512 traverses the second segment of the optical path 504 and reflects off the partially reflective surface 542 of the second optical plate 540. The beam 512 is then reflected back onto itself, once again transiting the second segment of the optical path 504.

When the length of the second segment 504 is of suitable dimensions relative to the wavelength of the input beam 510, the input beam 510 forms a standing wave along the second segment 504 inside the optical cavity 544, and within the photo-reactive material 524. The standing waveform has alternating or varying regions of high intensity and low intensity along the second segment 504 in the photo-reactive medium 524. The regions of high intensity of the standing wave are spaced at distances of approximately ½ wavelength apart along the second segment 504. The amplitude of these regions of high intensity in the second segment 504 are approximately proportional to the input intensity of the optical beam 510.

The regions of high intensity interact with the photo-reactive medium 524 to locally induce a change of refractive index 530. These regions of altered refractive index 530 are spaced at a distance of approximately one-half wavelength apart, where the wavelength is that of the input beam 510 that formed the local regions of changed index of refraction 530. The amount of change in the index of refraction at these local high intensity areas is approximately proportional to the amount of energy in the input beam 510. Thus, by reflecting the beam back upon itself inside the optical cavity 544 containing a photo-reactive medium 524, the beam 512 forms a Bragg diffraction grating 532 with a period approximately equal to the ½ wavelength of the beam that formed it, and with an amplitude approximately in proportion to the intensity of the input beam 510.

As the Bragg diffraction grating 532 forms, the beam reflects off the reflective surface 522 to propagate along the second segment 504, and through the Bragg diffraction grating 532. The beam 512 now interacts with the diffraction grating 532, and is scattered in either the forward or the reverse direction. Because the period of the Bragg diffraction grating 532 corresponds to one-half of the wavelength that formed it, other wavelengths contained in the beam 510 do not interact with the Bragg diffraction grating 532, and undergo no scattering.

Furthermore, because the amplitude of the Bragg diffraction grating 532 is proportional to the intensity of the input beam 510, the amount of scattering is proportional to the beam's input intensity. After passing through the Bragg diffraction grating 532, the beam is transmitted through the partially reflecting surface 542 and into the third segment 506 as the output beam 514.

The Fabry-Perot device can be, for example, a Fabry-Perot interferometer, or a Fabry-Perot etalon. According to one embodiment, the device includes a Fabry-Perot interferometer with at least one moveable partially reflective surface, and can be tuned to transmit or have a resonant peak at different wavelengths. The tunability of the interferometer comes at the cost of increased device complexity.

According to another embodiment, the device includes a Fabry-Perot etalon with fixed partially reflective surfaces, and is less complicated than the Fabry-Perot interferometer. Because the etalon has little or no tunability, it comes with a substantially predetermined set of transmission peaks, and is a good alternative for systems of known wavelengths, or which otherwise do not need a tuneable power equalizer. In some cases, an etalon may have limited tunability such as, for example, by heating or cooling the etalon to cause a change in cavity dimension.

Figure 6:
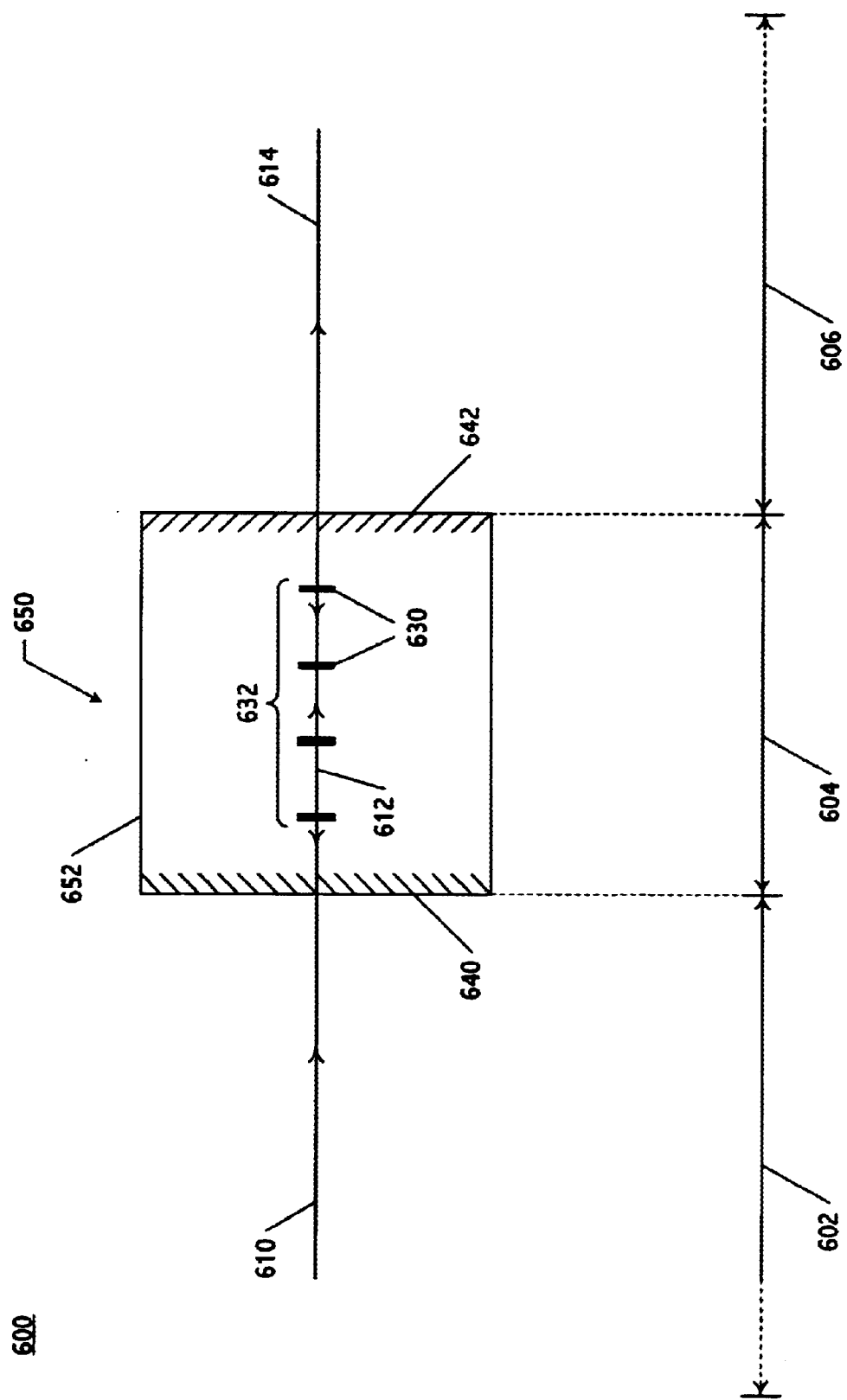
FIG. 6 schematic diagram of an apparatus for equalizing the power of at least one frequency in a multi-wavelength optical signal according to another embodiment of the invention.

FIG. 6 shows another embodiment of a power equalizer according to the invention. The power equalizer 600 of FIG. 6 includes reflective surfaces 640 and 642 formed directly on photo-reactive medium 652. In this example, an input signal 610 travels along a first segment 602, and passes through the first partially reflective surface 640 of the photo-reactive medium 652. The photo-reactive medium 652 is preferably of sufficient mechanical strength to maintain a polished surface suitable for coating with a partially reflective material, such as silver, gold or platinum, or a dielectric coating.

After passing through the first partially reflective surface 640, the signal 612 traverses the photo-reactive medium 652 of optical cavity 650, and reflects off the second partially reflective surface 642. After reflecting off the second partially reflective surface 642, the signal 612 propagates back along itself over the second segment 604 within the photo-reactive medium 652.

When the dimensions of the photo-refractive medium 652 are chosen such that the length of the second segment 604 is an integer number of wavelengths between the partially reflective surfaces 640 and 642, the signal 612 will form a standing wave along the second segment 604 inside the photo-reactive medium 652 with localized regions of high intensity 630. At the local high intensity regions of the standing wave 630, the photo-reactive medium 652 is induced to change its index of refraction.

Because the changes of index of refraction in the photo-reactive medium 652 occur at the localized high intensity regions 630, the changes necessarily occur with a period approximately equal to half of the wavelength in the medium of the signal forming the standing wave. When using a photo-refractive material for the photo-reactive medium, the photo-refractive material 652 is chosen so that its refractive index changes approximately in proportion to the intensity of the signal 612. Therefore, the amplitude of the change of index of refraction will be approximately proportional to the intensity of the input signal 610 creating a Bragg diffraction grating 632 with an amplitude approximately proportional to the intensity of the input beam 610.

After forming the Bragg diffraction grating 632, the signal 612 reflects off the first partially reflective surface 640, and traverses the photo-reactive medium 652 a third time along the same path. This path takes the signal 612 through the Bragg diffraction grating 632 where the beam 612 is scattered by the Bragg diffraction grating 632 formed by the input signal 610. The scattering is approximately in proportion to the intensity of the input signal 610. After passing through the Bragg diffraction grating 632, the beam 612 passes through the second partially reflective surface 642, and into the third segment 606 as the output signal 614. The output signal 614 is reduced in intensity relative to the input signal 610 by the Bragg diffraction grating 632 in an amount approximately proportional to the intensity of the input signal 610.

Figure 7:
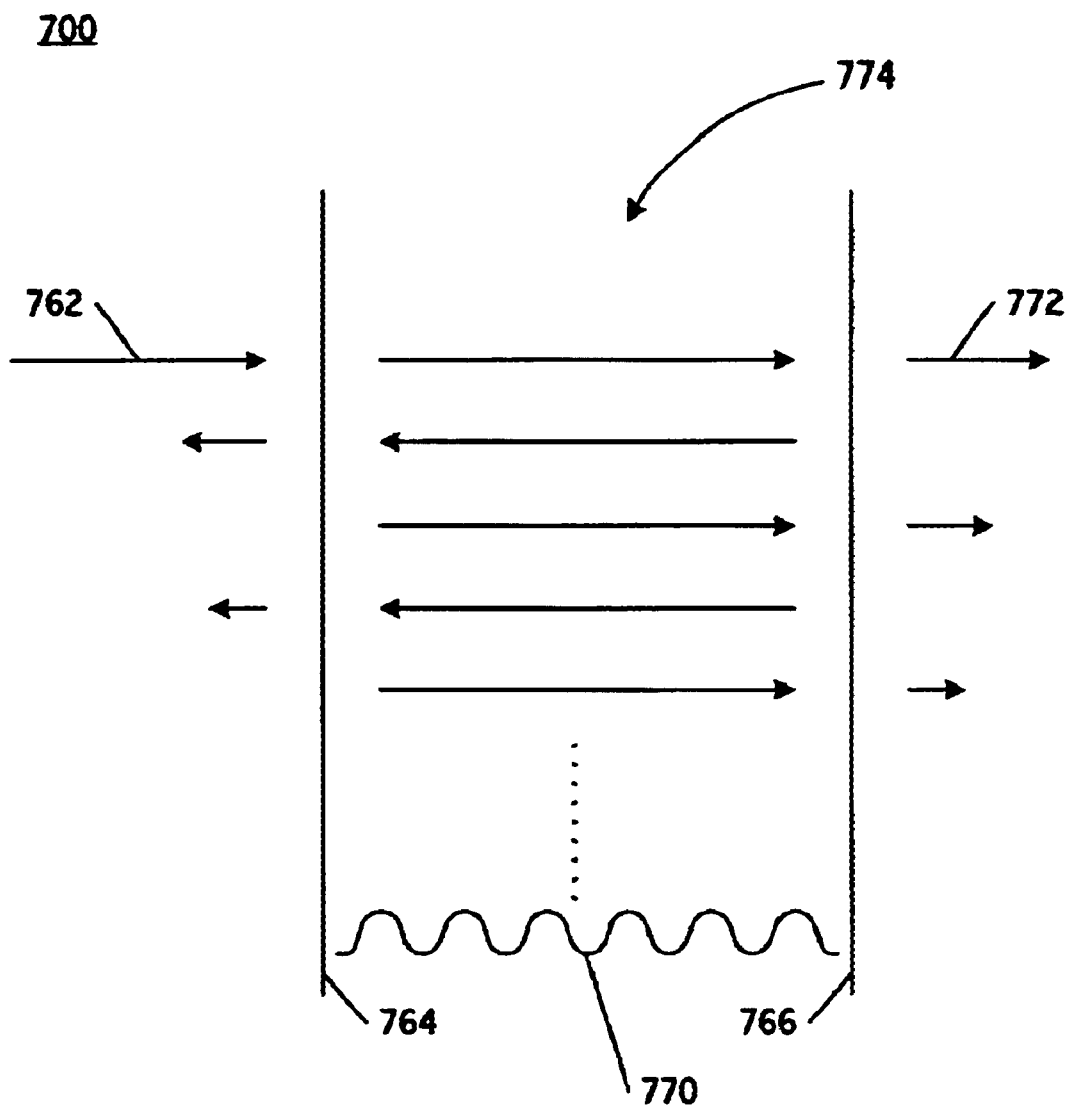
FIG. 7 is a schematic diagram of an apparatus for equalizing power with an input signal.

FIG. 7 is a schematic diagram of an optical cavity with an optical signal passing through it and the photo-reactive material within. The optical cavity 700 contains a photo-reactive material 774 and is bounded by partially reflective and partially transmissive surfaces 764 and 766. An input signal 762 containing frequencies at Fabry-Perot resonances, passes through the first reflective surface 764 into the photo-reactive medium 774 and forms a standing wave 770 between partially reflective surfaces 764 and 766. The signal then exits the cavity through the second partially reflective surface 766 as the output signal 772. Since the signal creates a standing wave 770 within the photo-reactive medium 774, it forms a photo-refractive Bragg grating which coincides with the standing wave 770. As the dots indicate, the beam makes multiple passes through the cavity. Peaks in the Fabry-Perot transmission spectrum are chosen to be at or near wavelength division multiplexing (WDM) channels. A grating period for each WDM channel is the same as the standing wave period, and light from each WDM channel is resonantly Bragg-scattered off of its own grating. The grating "spoils" the Fabry-Perot resonance, thereby reducing the resonant transmission at the WDM wavelengths. The Fabry-Perot transmission is reduced further as the incident channel intensity is increased, resulting in the equalizer effect. There is little to no crosstalk between adjacent WDM channels due to resonant scattering from the grating.

Figure 8:
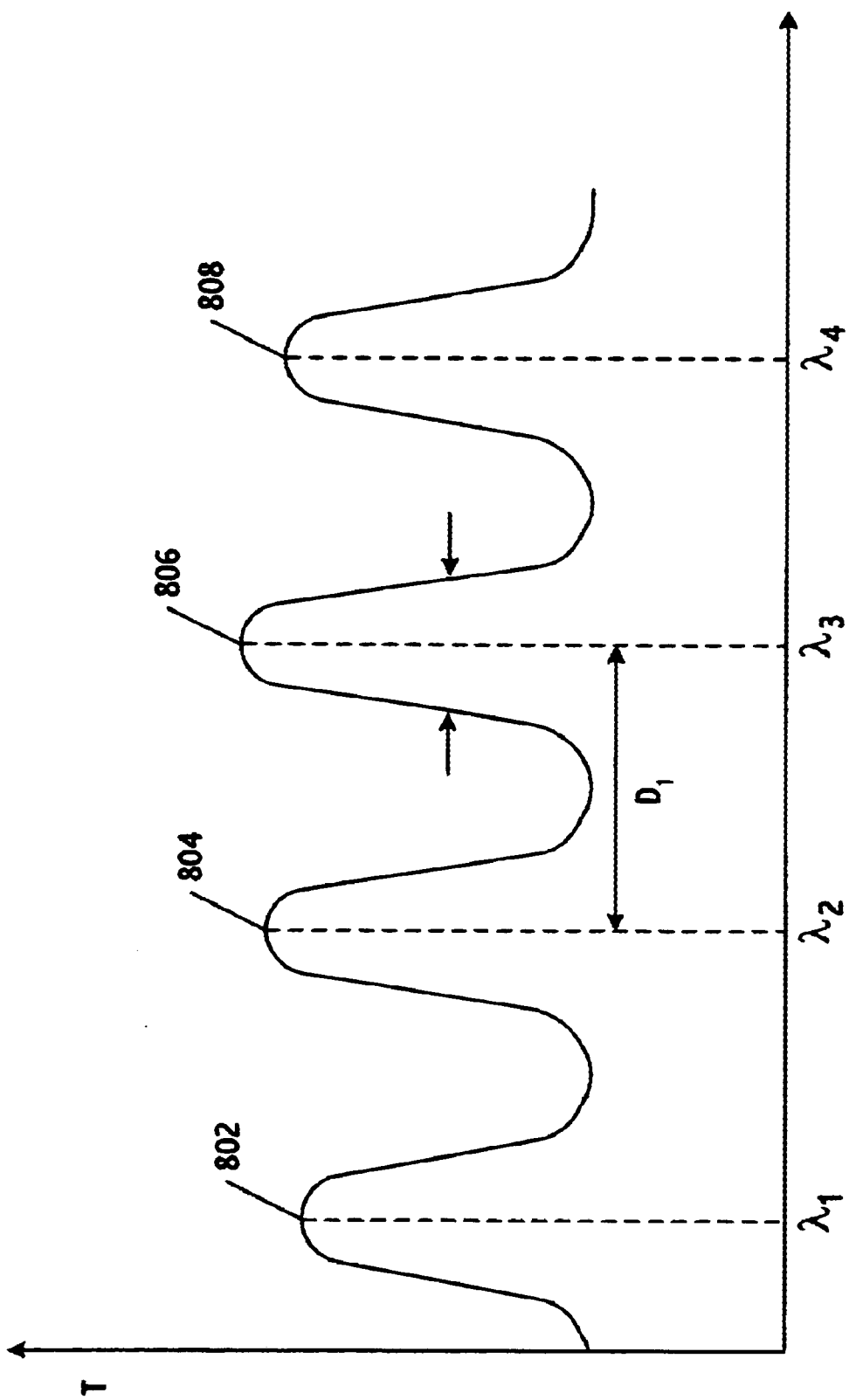
FIGS. 8 and 9 are a graphs of transmission coefficient versus wavelength for a Fabry-Perot device with different finesses.

FIG. 8 is a plot of the transmission coefficient of the Fabry-Perot device with a relatively high finesse versus wavelength of an input beam. The transmission peak 802 corresponds to a wavelength of $\lambda_1$, and the transmission peak 804 corresponds to a wavelength of $\lambda_2$. The transmission peak 806 corresponds to a wavelength of $\lambda_3$, and the transmission peak 808 corresponds to a wavelength of $\lambda_4$. The transmission peaks 802, 804, 806 and 808 occur at wavelengths $\lambda_1, \lambda_2, \lambda_3$ and $\lambda_4$, which are an integer number of half-wavelengths between the reflective surfaces of the Fabry-Perot device. The Fabry-Perot device has a transmission peak at each one of these wavelengths $\lambda_1, \lambda_2, \lambda_3$ and $\lambda_4$, because these wavelengths are of the dimension to form a standing wave between the reflective surfaces of the optical cavity. The spacing between the transmission peaks 810, is known as the "free spectral range" of the device, and is indicated by "$\Delta$." $\Delta$ can be calculated from the following equation:

$$\Delta = \frac{c}{2d} \qquad \text{Eq. 3}$$

Where "c" is the speed of light within the cavity, and "d" is the distance between the reflective surfaces. Thus, as the distance $D_1$ between the reflective surfaces of the Fabry-Perot device is increased, the spacing $\Delta$ between the transmission peaks decreases.

By increasing the distance $D_1$ between the transmission peaks, the Fabry-Perot device has fewer transmission peaks in a chosen optical band. The full width at the half maximum of the transmission peak is indicated by 812. The full width at half maximum of a transmission peak is known as the "resolution" of the Fabry-Perot device. Resolution of the Fabry-Perot device denotes the device's ability to distinguish between different wavelengths passing through the cavity, and is represented by $\delta$. The ratio of the free spectral range $\Delta$ to the resolution $\delta$ is the "finesse" F of the Fabry-Perot device. The finesse is represented by the following equation:

$$F = \frac{\Delta}{\delta} \approx \frac{\pi\sqrt{R}}{(1-R)} \qquad \text{Eq. 4}$$

where R is the reflectivity of the reflecting surfaces. For reflecting surfaces that are perfectly flat and perfectly parallel to one another, the finesse F of the Fabry-Perot device depends only on the reflectivity of the reflecting surfaces.

Figure 9:
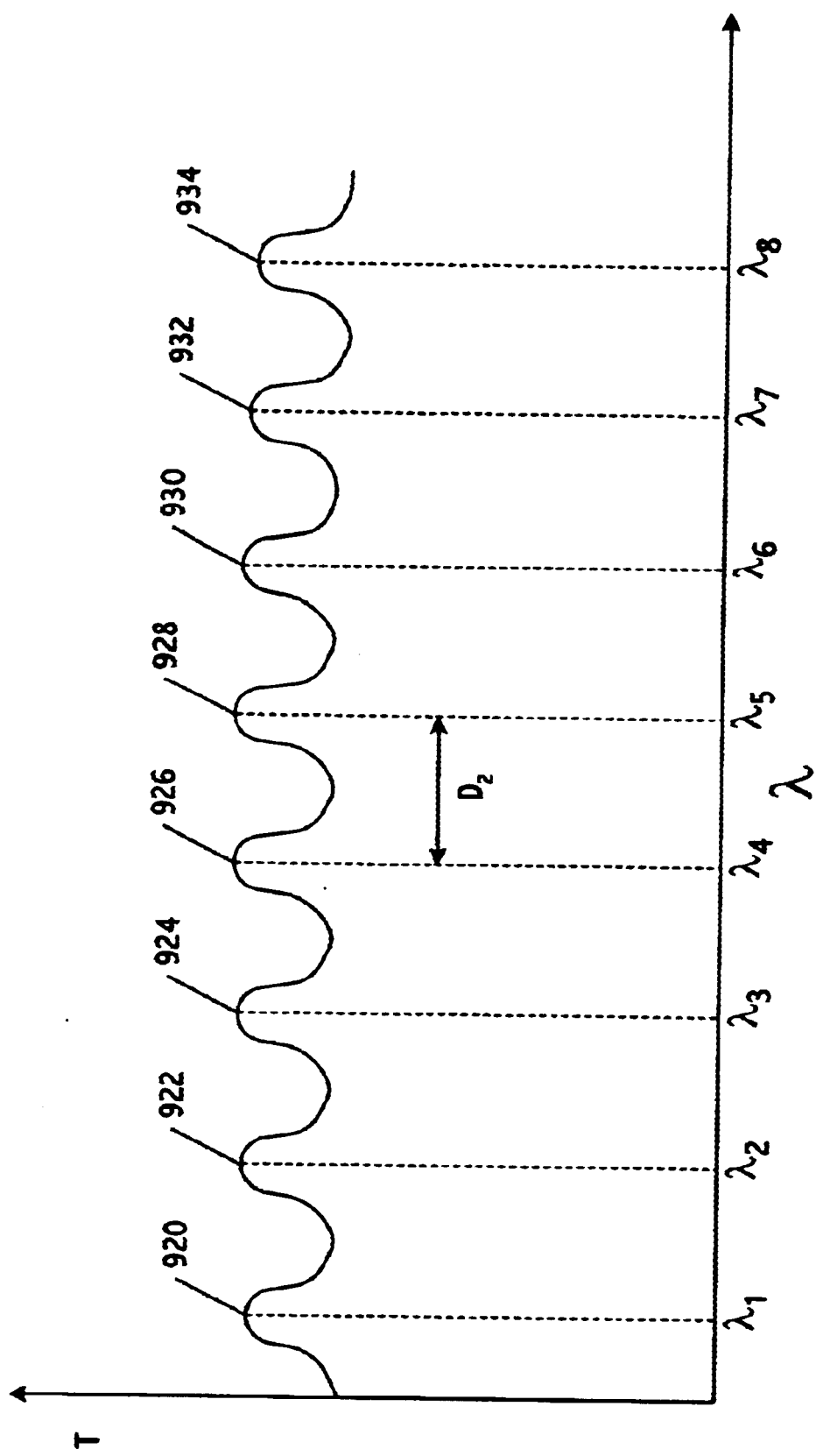

FIG. 9 is a plot of the transmission coefficient of the Fabry-Perot device with a relatively low finesse versus wavelength of an input beam. The transmission peaks 920, 922, 924, 926, 928, 930, 932, and 934, corresponds to wavelengths of $\lambda_1$, $\lambda_2$, $\lambda_3\lambda_4$, $\lambda_5$, $\lambda_6$, $\lambda_7$, $\lambda_8$ respectively. Because the device of FIG. 9 has a lower finesse than the device of FIG. 8, the maximum to minimum transmission ratio is reduced from that of FIG. 8. Reference numeral $D_2$ represents the distance between each peak, and $D_2$ does not need to be smaller than $D_1$ of FIG. 8.

The bandwidth of the power equalizer can be determined by, for example, the finesse of the cavity. The number of transmission peaks in a given bandwidth is dependent on the optical path length of the cavity, and does not depend on finesse. By choosing a lower finesse device, the bandwidth of the equalizer can be increased. The center frequency of the device can be determined by, for example, the cavity dimensions. Thus, equalizers can be manufactured with virtually any desired bandwidth and center frequency. The equalizer can be made tuneable where the finesse and dimensions of the cavity are adjustable. One constraint of such adjustability, is that the finesse must be sufficient to keep the beam in the cavity long enough for a grating to form.

By designing the optical cavity with a certain finesse, the bandwidth which will be equalized by the power equalizer can be chosen to match the bandwidth of the network into which the power equalizer will be inserted. By selecting the cavity parameters appropriately, the power equalizer can equalize all the frequencies in a signal, a portion of the frequencies in the signal, or a single frequency in the signal. Matching the parameters of the optical cavity to the optical signal causes the power equalizer operational frequency distribution to match the wavelength distribution of the signal. In a preferred embodiment, the Fabry-Perot cavity is matched if each wavelength in the system is at or near a Fabry-Perot peak. This way, the transmission is high and is the same for each wavelength if the power is evenly distributed. Operating in this mode is possible because the Fabry-Perot peaks are spaced evenly in frequency, rather than wavelength, as are the channels in a WDM system.

An equalizer that functions for the closely spaced wavelengths found in a wavelength division multiplex system will use high order peaks of the Fabry-Perot cavity so that each wavelength falls on a different Fabry-Perot peak.

Because the Kerr effect is much more prevalent than the photo-refractive effect, a Kerr medium was analyzed to determine whether it could generate a phase grating from an intensity grating. If the Kerr effect can be used, the choice of materials for the device will be considerably wider. Operationally, the difference between the two media is that the Kerr effect gives an index of refraction change proportional to the local light intensity while the photo-refractive effect gives an index change proportional to its gradient. Because the light intensity can never be negative, the Kerr effect gives a "DC" index change corresponding to the spatially averaged light intensity. This DC index change alters the optical path length of the Fabry-Perot cavity and therefore changes the transmission coefficient for all wavelengths. Using a Kerr medium will give unwanted coupling between wavelengths, so each wavelength will not be independently equalized unless it is possible to compensate for the DC index change by changing the Fabry-Perot cavity path length. This unwanted coupling will appear as cross phase modulation or crosstalk. A photo-refractive medium, on the other hand, has no DC index change, and equalizes each wavelength without crosstalk.

To verify the operation of the equalizer, the power transmission coefficient of a photo-refractive Fabry-Perot cavity has been calculated. In the calculation, the standard coupled wave approximation was not used because of the strong coupling between the light and the grating. For example, see P. Yeh, "Contra-Directional Two-Wave Mixing in Photorefractive Media," *Optics Commun.,* 45,323–326, (1983), which is hereby incorporated by reference. Instead, the exact calculation of Chen and Mills for a Kerr medium modified for a photo-refractive medium was used. See W. Chen and D. L. Mills, "Optical Response of a Nonlinear Dielectric Film," Phys. Rev. V. 35, 524–532 (1987), which is hereby incorporated by reference. The model equalizer is an uncoated slab of a lossless photo-refractive material of thickness D with plane waves propagating along the z-axis. Because a likely photo-refractive material for the equalizer is a semiconductor, an index of refraction of 3.2 that is typical of a semiconductor was used. The principal axes are the x- and y-axes. Saturation of the photo-refractive effect was neglected and mutual coherence of the forward and reverse waves was assumed. With these assumptions the modulation depth of the index of refraction is $\kappa I_{in}$ for light polarized along one of the principle axes and $-\kappa I_{in}$ polarization along the other, where $I_{in}$ is the incident light intensity and the sign change corresponds to a 180° phase shift in the grating. An equalizer that functions for the closely spaced wavelengths found in a wavelength division multiplex system will use high order peaks of the Fabry-Perot so that each wavelength falls on a different Fabry-Perot peak. Our calculations are carried out to approximately the fiftieth order peak, but due to long calculation times, orders beyond this were not calculated systematically. The behavior for higher orders is similar. The results of the calculation are shown in FIG. 3.

Figure 3:
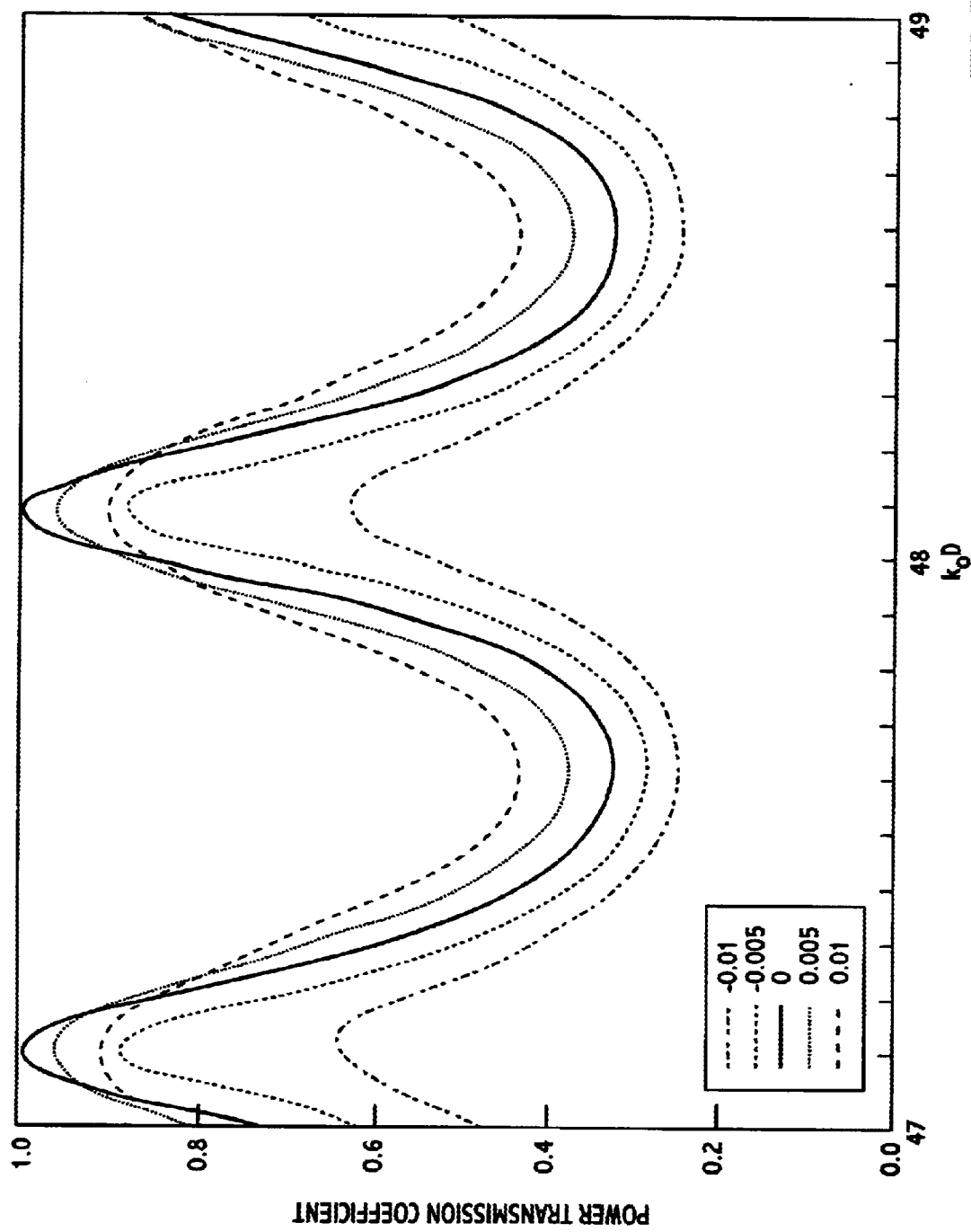
FIG. 3 is a graph of calculated power transmission coefficient versus wave number for a Kerr medium of thickness D at various modulation depths.

FIG. 3 shows the calculated power transmission coefficient T as a function of in vacuo wavenumber $K_0$ for various $\kappa I_{in}$. FIG. 3 shows that the transmission near the peaks decreases for increasing incident intensities, demonstrating the characteristics necessary for power equalization. Equalization occurs for all wavenumbers at negative κ, but occurs only near Fabry-Perot peaks for positive κ. Because the sign of κ depends on the polarization of the incident light, the equalizer is polarization dependent. Equalization occurs for all wavenumbers when the polarization of the incident light is along one of the principle axes, but only within bands centered at the Fabry-Perot peaks for the orthogonal polarization. Guaranteeing that the incident polarization always corresponds to a negative κ will give a more robust equalizer where the Fabry-Perot peaks do not have to match the system wavelengths.

Controlling the polarization of input beam into the power equalizer such that the incident polarization always corresponds to a negative κ will give a more robust equalizer. This may be accomplished with a polarization-preserving system or with polarization diversity.

Figure 10:
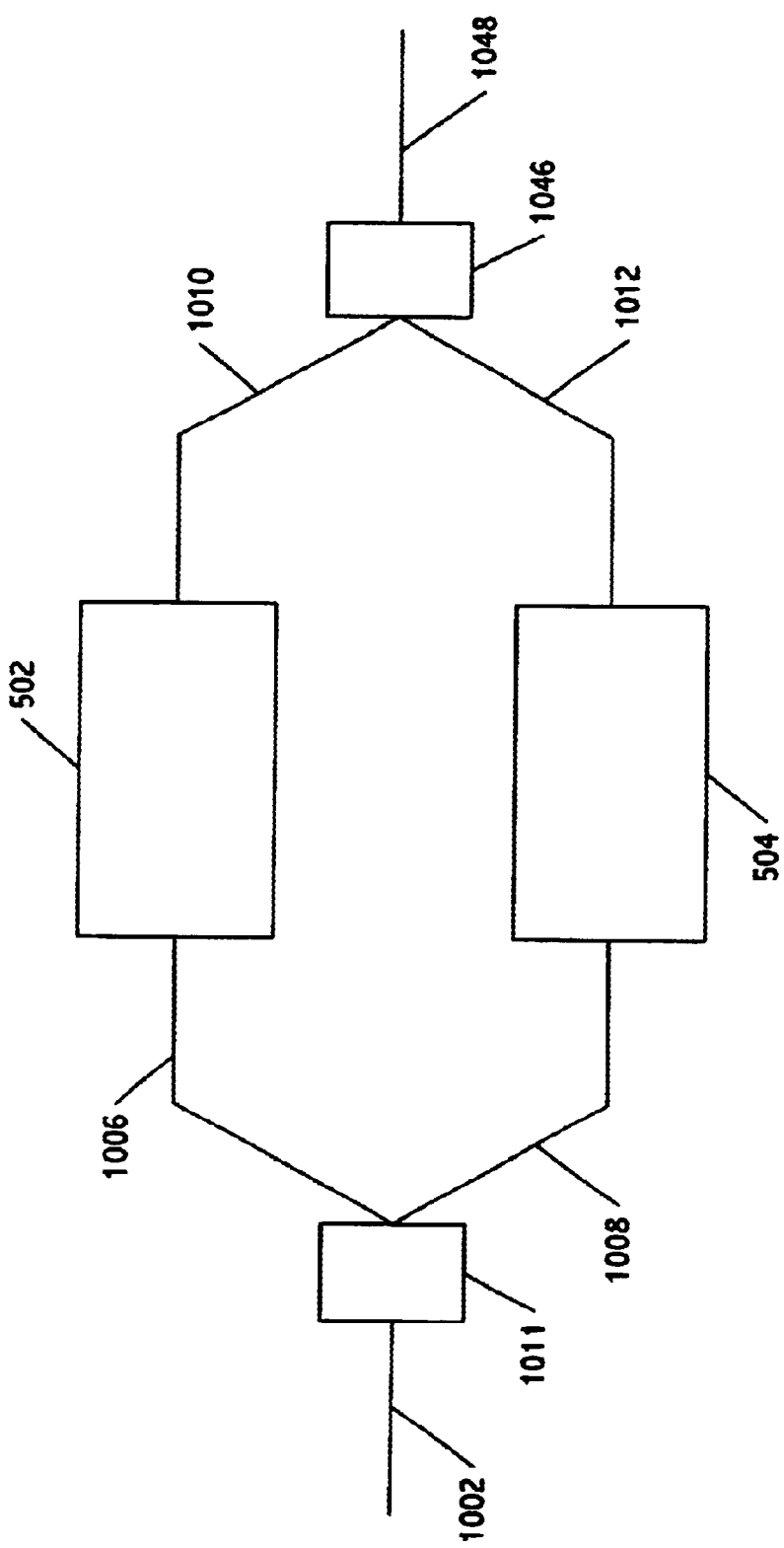
FIG. 10 shows power equalizers in a polarization splitter configuration.

FIG. 10 shows power equalizers in a polarization sensitive configuration where the signal is split into orthogonal polarizations, each portion is then equalized separately, and then recombined. In FIG. 10, there is a input waveguide 1002, coupled to a polarization splitter 1011. After the polarization splitter 1011, a first waveguide 1006, and second waveguide 1008, couple the signal into power equalizers 502 and 504. Elements 502 and 504 are power equalizers similar to that depicted in FIG. 5. After the power equalizers, a third and fourth waveguide 1010 and 1012 couple the signals into a polarization combiner 1040 (which can also be a polarization splitter) to recombine the signal. 1048 forms the output of the polarization combiner 1040. With this configuration, polarization sensitivity is circumvented with polarization diversity. Polarization diversity is splitting the signal into orthogonal polarizations, equalizing each polarization separately, and recombining the signal. In this embodiment, the polarization splitter is used to provide orthogonal polarization to effect polarization diversity. Light that is not linearly polarized along a principle axis is decomposed into X- and Y-linearly polarized light.

The index modulation for each component is approximately proportional to the intensity for that component, and T is the intensity-weighted average of the two component transmission coefficients. The transmission coefficient of each component depends only on the intensity of that component and not on the phase. Thus, the transmission coefficients of left and right circular polarized light and of linear polarized light at 45° to a principle axis are identical because they differ only by the phase angle between the two components.

Figure 11:
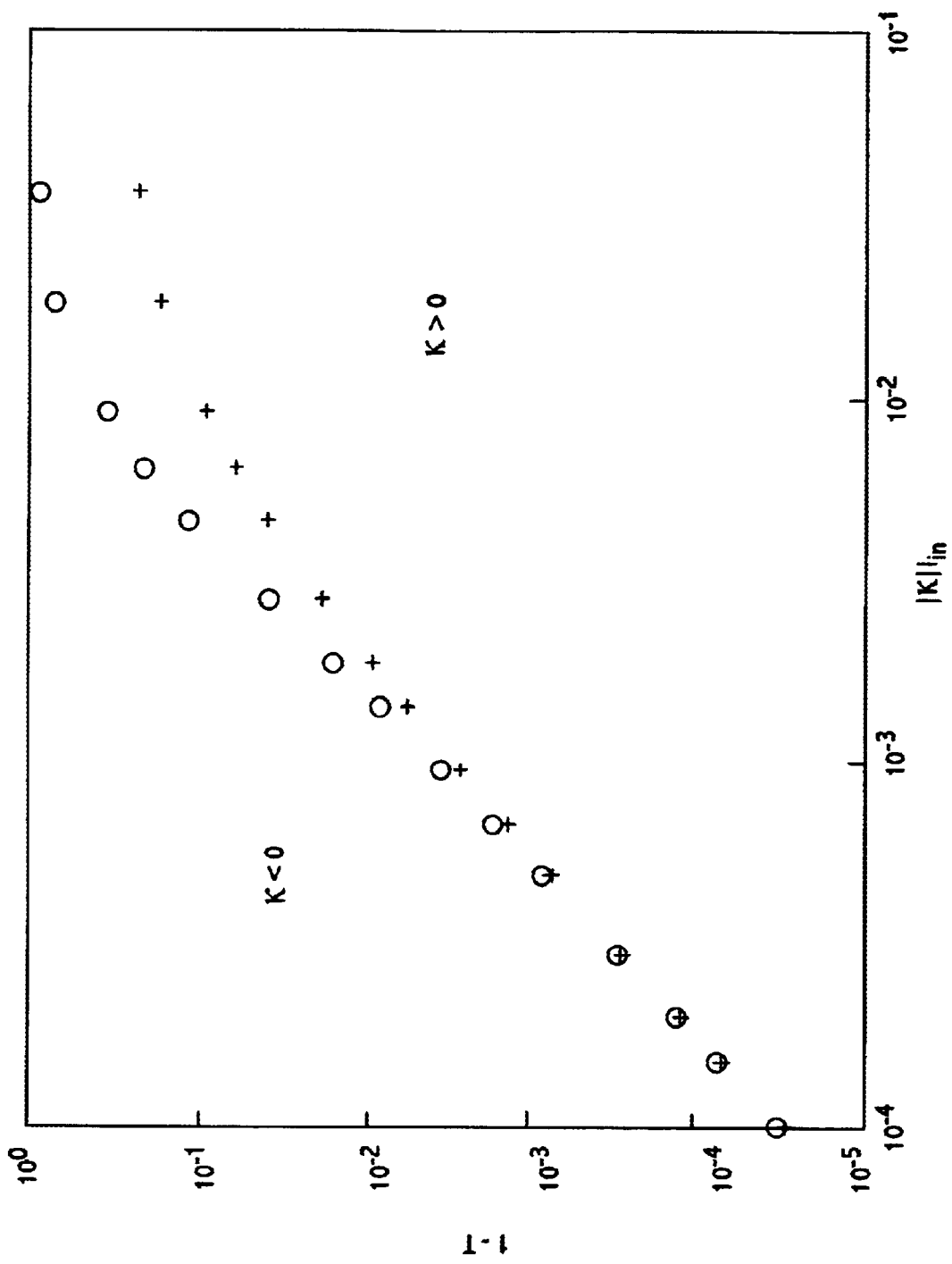
FIG. 11 shows the calculated scattering coefficient near a transmission peak for positive and negative K where K is a number that characterizes the strength of the photorefractive effect in the material used to make the equalizer.

Of particular importance in analyzing the behavior of the equalizer in a network is T as a function of the input $I_{in}$. FIG. 11 shows 1-T as a function of $\kappa I_{in}$ at a wavelength located at a Fabry-Perot peak, which is given to a good approximation by the following equation:

$$T = 1 - \alpha^\gamma I_{in}^\gamma \qquad \text{Eq. 5}$$

where α and γ are device-dependent parameters. The parameter γ=2 for both κ>0 and κ<0 for small $|\kappa I_{in}|$. This is the expected dependence for a four-wave mixing process because the reflected field is the product of the incident field mixed with itself three times.

Figure 13:
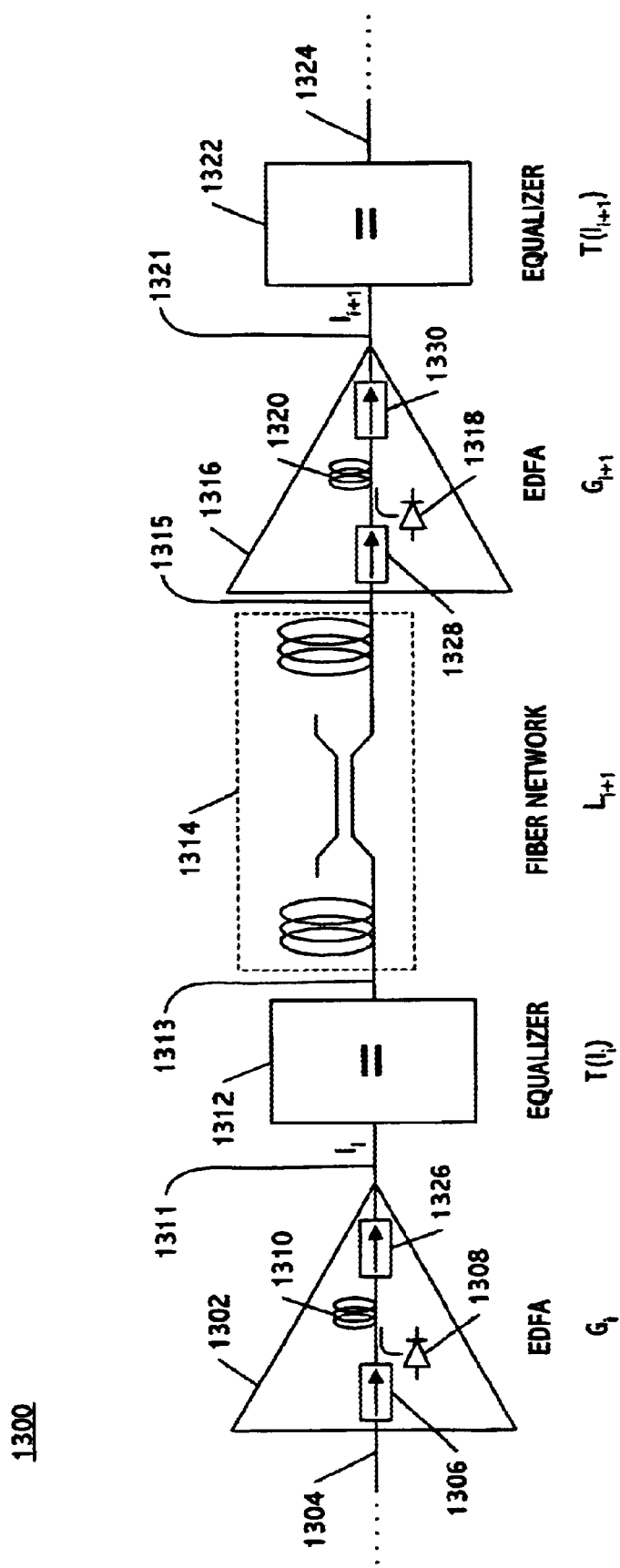
FIG. 13 shows an arbitrary generalized fiber network, amplifier, and equalizer combination.

FIG. 13 is a schematic diagram of an arbitrary EDFA and equalizer combination of an optical network, 1300. This diagram represent only a segment of an optical network, and many more EDFAs and equalizers may be present in the system. The first EDFA 1302, has a gain of $G_i$ and is connected to an input fiber 1304, which receives a signal from the first segment of the network (not shown) with a loss of $L_i$. Within the first EDFA 1302, is diode laser pump 1308, and erbium doped fiber 1310 and a first and second optical isolator 1306 and 1326, respectively. The output 1311, of strength $I_i$, of the first EDFA 1302, is received by the first power equalizer 1312, with a transmission coefficient of $T(I_i)$. The output 1313, of the first power equalizer 1312, is received by the first fiber network segment 1314, which has a loss of $L_{i+1}$. The output 1315, of the first fiber network segment 1314, is received by the second EDFA 1316. Within the second EDFA 1316, is diode laser pump 1318, and erbium doped fiber 1320 and a third and fourth optical isolator 1328 and 1330, respectively. The output 1321, of strength $I_{i+1}$, of the second EDFA 1316, is received by the second power equalizer 1322, which has an output 1324. Some or all of the EDFA and equalizer pairs may also incorporate other components such as an optical isolator, directional coupler, etc.

Figure 14:
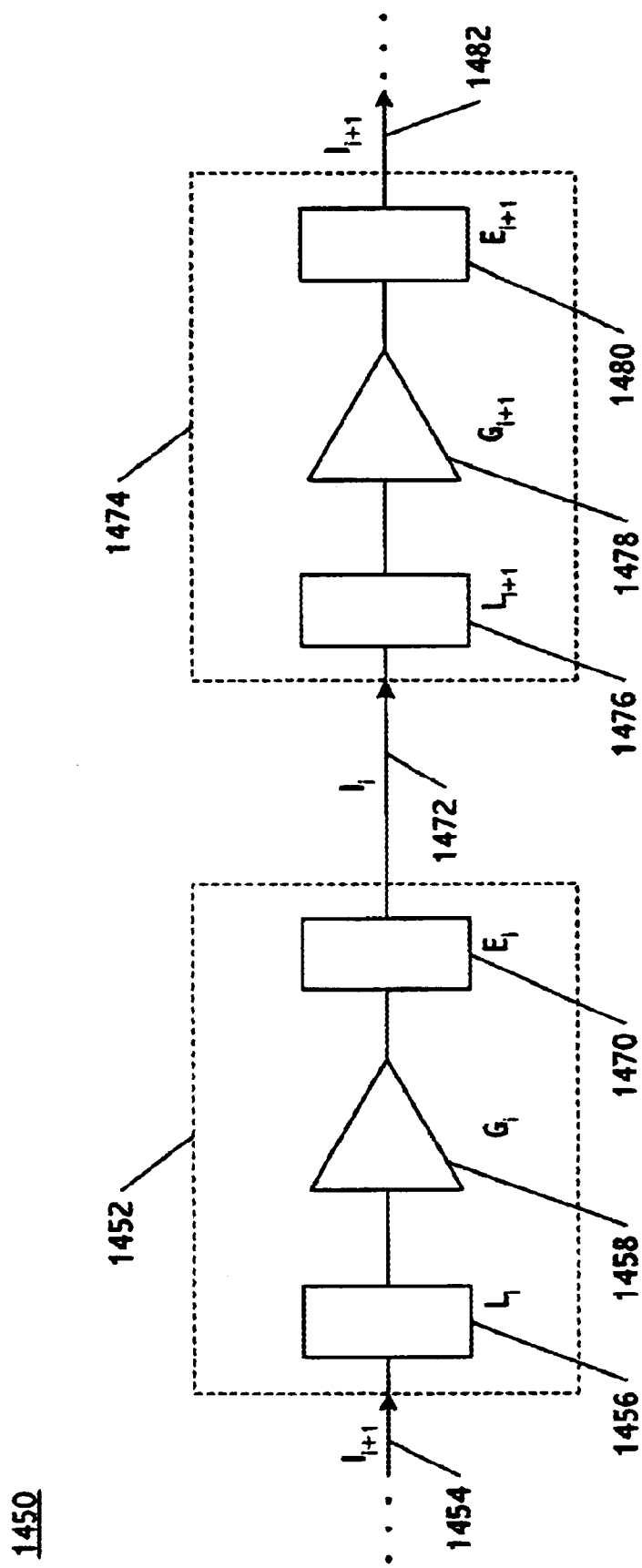
FIG. 14 shows an arbitrary generalized fiber network, associated network loss, amplifier, and power equalizer combination according to the invention.

A simplified version of the schematic diagram of an arbitrary EDFA and equalizer combination of an optical network is shown in FIG. 14. In this diagram, a first network segment 1452, receives an input 1454, of $I_{i-1}$ strength from previous network segment (not shown). The first network segment 1452, includes an associated loss 1456, of $L_i$, an amplifier 1458, with a gain of $G_i$, and an equalizer 1470, with a power dependent transmission function $E_i$. The output 1472, of the first segment 1452, has a strength of Ii, and is received by the second segment, 1474. The second segment 1474, includes an associated loss, 1476 of $L_{i+1}$, an amplifier 1474, of $G_{i+1}$ gain, and an equalizer 1480, of power dependent transmission function $E_{i+1}$. The second segment 1474, has an output 1482, of strength $I_{i+1}$.

T of the form given by Eq. 5 will prevent the previously described network instability without requiring the component values be exactly matched for a network employing a long chain of EDFA's where the gain of the $i^{th}$ EDFA is $G_i$, as illustrated in FIGS. 13 and 14. Since each wavelength is independently equalized, only a single wavelength at a time need be considered. The fiber network upstream from the $i^{th}$ EDFA has loss $L_i$ that includes fiber losses, splitting losses and coupling losses in the EDFA. Thus, the chain consists of many segments, each with a gain of $G_i$ and an associated loss of $L_i$. The output $I_i$ of the $i^{th}$ EDFA without equalization is given by the following equation:

$$I_i = L_i G_i I_{i-1} \qquad \text{Eq. 6}$$

$I_i$ remains finite for large i if $L_i G_i=1$ in each segment. Strictly speaking, a system only needs the accumulated losses to balance the accumulated gains in a long chain.

In a switched network where segments can be added or dropped from the chain, the loss and gain of each segment should preferably be balanced because there is no guarantee that a group of segments with a net balance of gain and loss will always be together. The balance of gain and loss is the basis for other equalizers previously described. By having more gain than loss and adding a controlled amount of excess loss, through an adjustable attenuator for example, this condition could be satisfied.

However, the balance between gain and loss is critical. Slight systematic excess of either gain or loss will yield an exponential growth in the chain. In a multi-wavelength network, the gain and loss must be exactly balanced for each wavelength.

The situation is drastically different when an adaptive equalizer with a transmission coefficient $T_i$ described by Eq. 5 is in the network after each EDFA. The intensity $I_i$ exiting the $i^{th}$ equalizer is given by the following equation:

$$I_i = L_i G_i (1 - \alpha^\gamma L_i^\gamma G_i^\gamma I_{i-1}^\gamma) I_{i-1} \qquad \text{Eq. 7}$$

The intensity takes on a finite asymptotic value, $I_i = I_{i-1}$, as given by the following equation:

$$\alpha I_i = \frac{1}{L_i G_i}\left(1 - \frac{1}{L_i G_i}\right)^{\frac{1}{\gamma}} \qquad \text{Eq. 8}$$

when $L_i G_i > 1$ for each segment. $\alpha I_i$ achieves its maximum value of $\gamma/(\gamma+1)^{(\gamma+1)/\gamma}$ when $L_i G_i = (\gamma+1)/\gamma$. Thus, the intensity in a long chain will remain finite even if the gain exceeds the loss in each segment.

The power equalizer according to the invention prevents the intensity from growing exponentially along the chain. The asymptotic intensity is determined by device parameters α and γ, and by the network parameter $L_i G_i$. Similar to the case without the equalizer, the condition that $L_i G_i > 1$ for each segment may be relaxed if a gain deficiency in one segment is compensated by excess gain in another. However, in a switched network where compensating segments may not always be paired, the most straightforward design would have each segment satisfy the condition $L_iG_i>1$. $L_iG_i$ will vary as the input changes or as system components age. The equalizer output is least sensitive to these variations in $L_iG_i$ when $L_iG_i=(\gamma+1)/\gamma$, for $\gamma=2$, $L_iG_i=1.5$.

Figure 15:
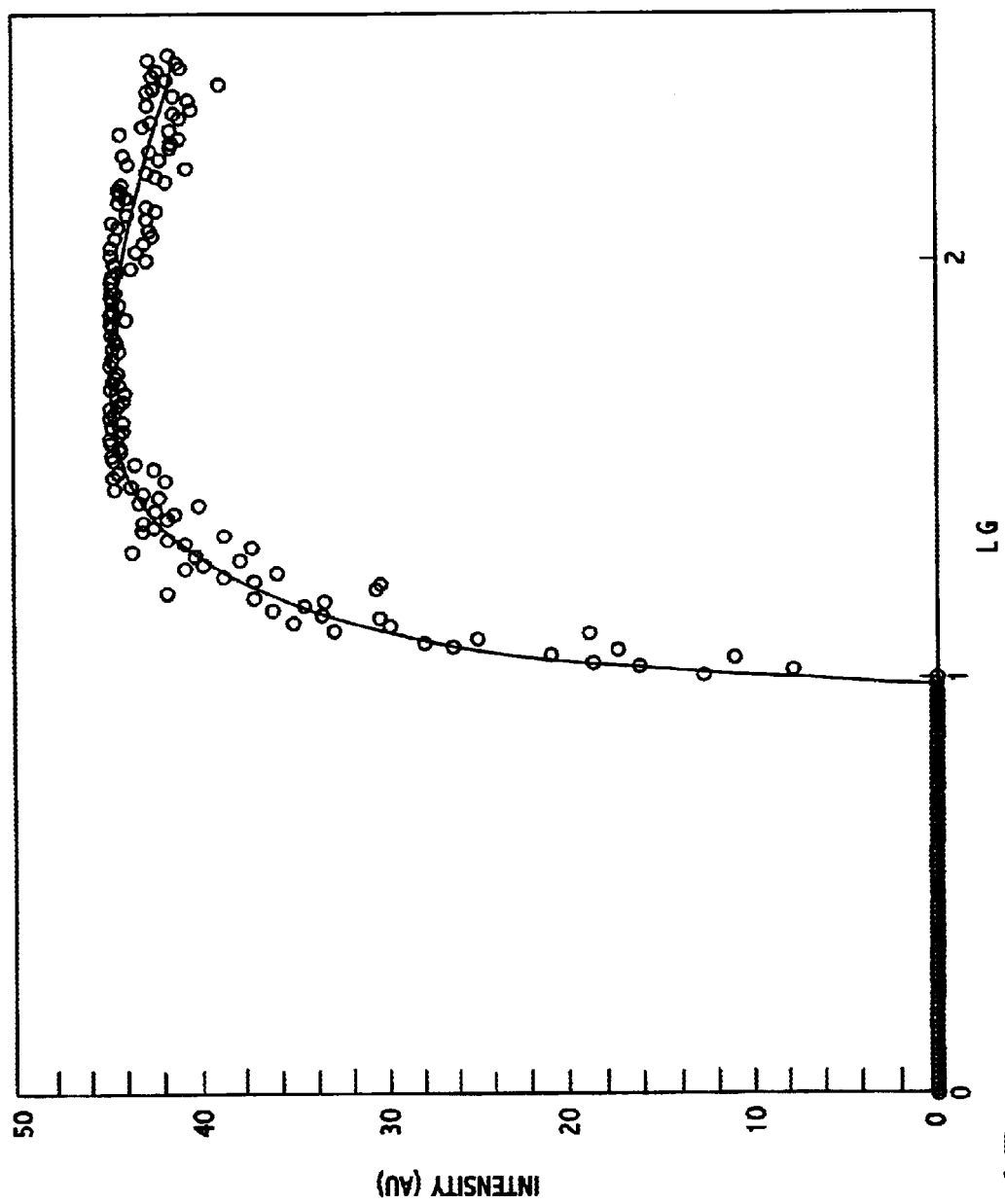
FIG. 15 shows calculated intensity of a signal after traversing 1000 loss-gain-equalization segments.

For example, the calculated intensity of a signal after traversing 1000 loss-gain-equalization segments is shown in FIG. 15. The intensity-dependent transmission coefficient for the power equalizer is approximated by $\tanh^2(54.8_k I_i)$. This result is numerically obtained with $L_iG_i=LG$. The calculation indicates that the system is stable for $1<LG<2.5$. In a system without equalizers, the intensity would grow exponentially from the excess gain. The solid line assumes that $L_iG_i$ has the same value LG in each segment. Circles are calculated assuming that $L_iG_i$ is a random variable with values uniformly distributed between LG−0.2 and LG+0.2. The system is still stable.

In a multi-wavelength network where $L_iG_i>1$ is satisfied for each wavelength in each segment, the intensity of each wavelength would approach a different asymptotic value. Although the power equalizer according to the invention may not have a perfectly flat output spectrum, the power equalizer prevents differences at various wavelengths from accumulating. The intensity for each wavelength at the end of a long chain is given by Eq. 8 evaluated for that wavelength so the wavelength-to-wavelength variations are characteristic of the variations in a single segment rather than of the accumulated variations of an unequalized chain. These single segment variations are relatively small and would not cause the instability that results when these variations become large.

Figure 12:
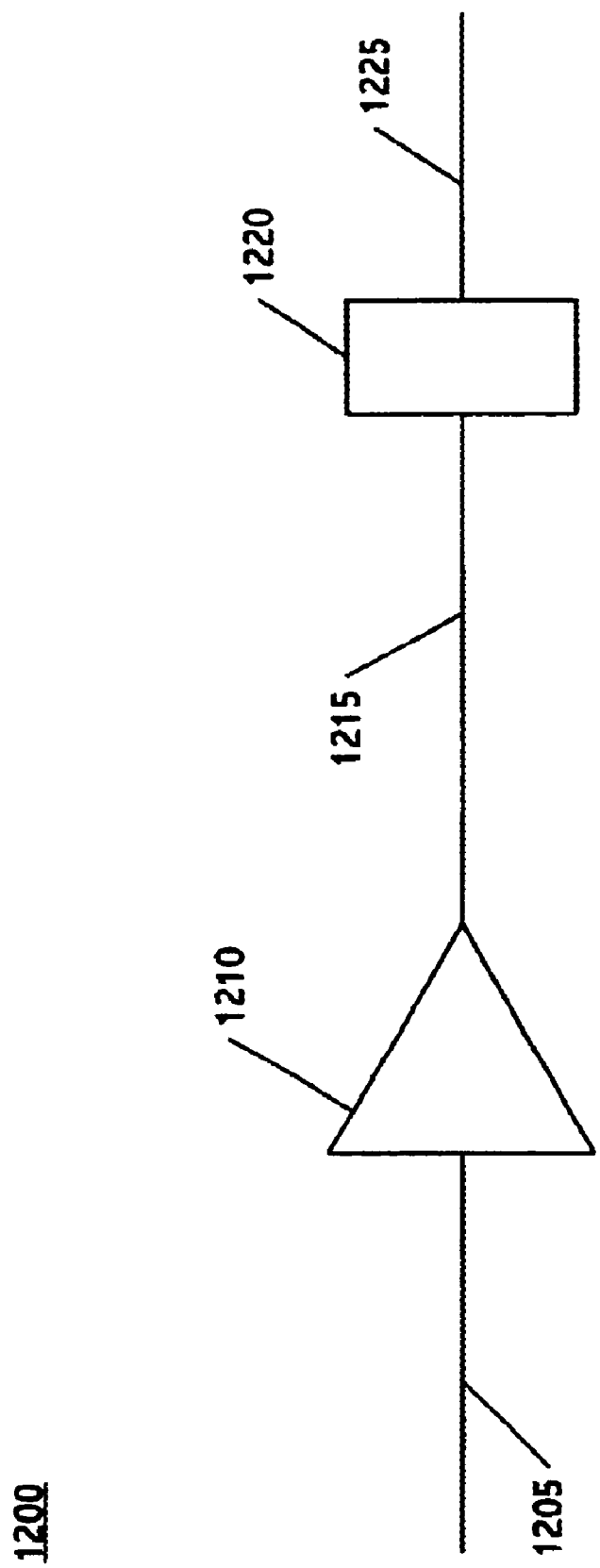
FIG. 12 shows a single EDFA and an equalizer.

FIG. 12 shows a single EDFA and equalizer. Although there can be any number of amplifiers and equalizers in a system, the amplifier/equalizer pair may be considered a typical building block used in an optical network. In this example, the EDFA 1210 receives an input 1205 and produces an output 1215. The equalizer 1220 receives the output 1215 of the EDFA 1210, and produces an equalized output 1225. That is, the output power rather than the gain is equalized. The difference is that by equalizing the output, the output does not vary much even as the input varies. Accordingly, the gain of an EDFA is equalized now by putting a static filter with the inverse of the gain spectrum.

In some circumstances, it may be advantageous to interpose an optical isolator between the EDFA and the power equalizer so light reflected from the equalizer is isolated from the EDFA. The amplifier/equalizer pair may be cascaded to produce a strong signal with a uniform distribution of power throughout the system's bandwidth. Alternatively, a group of equalizers may be cascaded without intervening amplifiers or a group of amplifiers may be cascaded without intervening equalizers. For any of the above combinations, each equalizer may be adjusted to filter a single wavelength, or to equalize a separate band or group of wavelengths.

FIG. 12 also illustrates how a system can incorporate a single power equalizer to limit the optical energy introduced into a network. As more energy is directed into the system, the power equalizer increasingly attenuates the signal thereby protecting downstream components from damage by too much energy. This power limiting characteristic can be applied to signals with a single frequency component, or to signals with multiple frequency components. Multiple power equalizers can be cascaded to function as multiple power limiters to provide further protection to energy-sensitive components.

Regardless of how many equalizers are distributed within a network, each equalizer can be independently adjusted to filter a single wavelength or a group of wavelengths. The bandwidth of the device is the range of frequencies for which it provides power equalization, and the center frequency of the device is the middle frequency of the bandwidth. For any given application, the center frequency of the equalizer can be adjusted or determined independently of the bandwidth of the equalizer, with the converse being true as well. The bandwidth of the power equalizer can be determined by, for example, the finesse of the cavity. The center frequency of the device can be determined by, for example, the cavity dimensions.

As discussed herein, the equalizer according to one embodiment of the invention can equalize the power at all wavelengths of a multi-wavelength signal, can prevent one wavelength of a multi-wavelength signal from dominating a WDM signal, can equalize multi-wavelength power levels without a feedback signal, can provide switching in a network system without destabilizing the network, can stabilize the output of a fiber optic laser, can equalize the signal input to a laser, can stabilize the output of multiple fiber optic lasers, can stabilize the operation of components used in a fiber optic system, can limit the power in a single or multi-wavelength signal, can protect energy sensitive components, can allow removal and insertion of components of an optical network without destabilizing the network, and can produce a multi-wavelength signal with the power of each wavelength substantially equal. Additionally, equalizers can be cascaded with an optical network to produce a desired effect.

Figure 18:
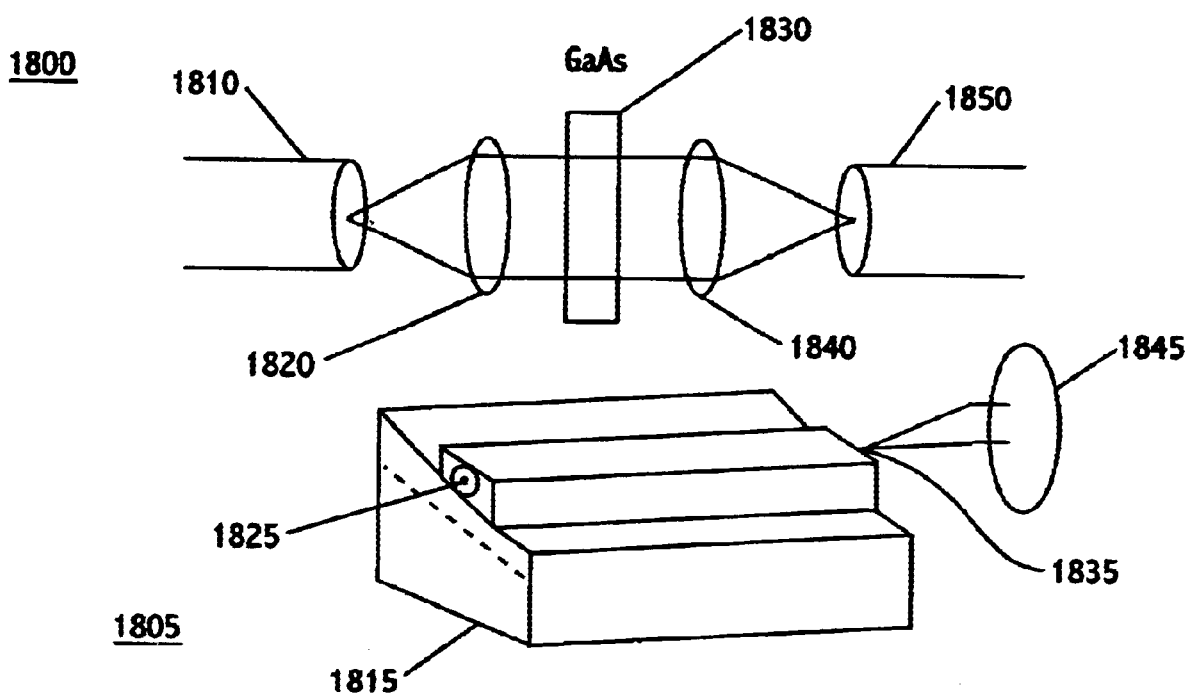
FIG. 18 shows a power equalizer incorporating lenses, and an integrated power equalizer manufactured on a substrate of suitable material.

FIG. 18 shows two embodiments of the power equalizer. The embodiment represented by 1800, is the power equalizer further incorporating lenses 1820 and 1830, to couple the signal from the wave guides 1810 and 1850, into the photo-refractive material 1830. Such an embodiment may, for example, be used to reduce the fluence the equalizer operates at by dispersing the signal within the photo-refractive material 1830. The second embodiment 1905, shows a substrate 1815, incorporating a power equalizer with an input port 1825, and an exit port 1835, which couples 1845, into other components of the network.

The above-described power equalizer is a new type of optical equalizer that can prevent a large difference in power from accumulating between channels in a switched wavelength division multiplexed optical network. The device, which is a photo-refractive Fabry-Perot cavity, is adaptive, so it does not require dispersion of the wavelengths to function. Without the need to disperse the wavelengths, optical coupling in and out of the device is greatly simplified. The device is passive, is scalable with the number of wavelengths and does not require an external reference to equalize power in a WDM signal. These properties make the equalizer attractive for use in all-optics networks.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A power equalizer, comprising:
   an optical cavity adapted to receive and transmit an optical signal;

a photo-reactive medium disposed within said optical cavity, wherein the photo-reactive medium is configured to adaptively form a diffraction grating configured to scatter at least a portion of the optical signal in proportion to the intensity of the optical signal.

2. The power equalizer of claim 1, wherein the optical signal is comprised of at least one substantially single frequency signal and adaptively forms at least one diffraction grating within said photo-reactive medium, where said at least one diffraction grating is adapted to selectively scatter at least one of the substantially single frequency signals in proportion to the intensity of the scattered signal.

3. The power equalizer of claim 1, wherein the optical signal is comprised of multiple particular frequencies, and the optical signal adaptively forms more than one diffraction grating within said photo-reactive medium, where each diffraction grating is adapted to selectively scatter a particular frequency of the optical signal in proportion to the intensity of that particular frequency.

4. The power equalizer of claim 1, wherein said photo-reactive medium has a low-fluence threshold below the intensity of the optical signal.

5. The power equalizer of claim 1, wherein said optical cavity comprises a Fabry-Perot cavity.

6. The power equalizer of claim 1, wherein said optical cavity is tunable.

7. The power equalizer of claim 1, wherein said photo-reactive medium comprises a dynamic photo-refractive material.

8. The power equalizer of claim 1, wherein said photo-reactive medium comprises one of gallium arsenide or other III–V or II–VI semiconductors, lithium niobate, lithium niobate doped with iron, zinc telluride doped with vanadium, zinc telluride doped with vanadium and manganese, and the polymer $PVK:PDCST:BBP:C_{60}$.

9. The power equalizer of claim 1, wherein said optical cavity has substantially fixed dimensions.

10. The power equalizer of claim 9, wherein said optical cavity is substantially stabilized against thermally induced changes.

11. The power equalizer of claim 1, wherein at least one dimension of the optical cavity is controllably variable.

12. The power equalizer of claim 1, further comprising a directional coupler configured to direct light scattered from said diffraction grating out of the optical path.

13. The power equalizer of claim 1, wherein the equalizer is optically coupled to an optical amplifier.

14. A system comprising a plurality of power equalizers of claim 1, optically coupled to each other.

15. The power equalizer of claim 1, wherein the optical cavity has a finesse that approximately matches a wavelength distribution of the optical signal.

16. The power equalizer of claim 15, wherein the optical cavity has a finesse that is sufficiently low to enable power of at least two wavelengths of the optical signal to be approximately equalized.

17. The power equalizer of claim 1, wherein the optical cavity has a finesse selected such that power is approximately equalized for multiple wavelengths in the optical signal.

18. The power equalizer of claim 1, wherein the optical signal includes multiple wavelengths approximately evenly spaced apart and the optical cavity has a finesse matched to the optical signal.

19. The power equalizer of claim 18, wherein the cavity of the power equalizer has multiple transmission peaks matched to pass multiple wavelengths in the optical signal.

20. A system comprising multiple cascaded power equalizers of claim 2, each having a different center frequency.

21. The system of claim 20, wherein the bandwidth of at least one power equalizer is substantially adjacent to the bandwidth of at least one other power equalizer.

22. A power equalizer as claimed in claim 1, wherein the photo-reactive medium comprises a photo-refractive medium having a resultant change in refractive index ($\overline{\Delta n}(z)$) of approximately zero.

23. The power equalizer of claim 1, further comprising at least one polarization splitter optically coupled upstream from said optical cavity.

24. The power equalizer of claim 1, further comprising an optical amplifier optically coupled upstream from said optical cavity, whereby said optical cavity and medium operate cooperatively to equalize the output power of the optical signal.

25. A system, comprising:
a splitter having a first output and a second output;
a first power equalizer of claim 1 optically coupled to said first output;
a second power equalizer of claim 1 optically coupled to said second output; and
a combiner optically coupled to said first power equalizer and optically coupled to said second power equalizer.

26. The system of claim 25, wherein said splitter comprises a polarization splitter and said combiner comprises a polarization combiner.

27. The system of claim 26, wherein:
said first power equalizer receives light of a first polarization from said polarization splitter and outputs output light of first polarization from said first output;
said second power equalizer receives light of a second polarization from said polarization splitter and outputs output light of second polarization from said second output; and
said polarization combiner receives and combines said output light of first polarization and said output light of second polarization.

28. The system of claim 27, wherein said first power equalizer equalizes the output light of first polarization and said second power equalizer equalizes the output light of second polarization.

29. The system of claim 26, wherein said polarization splitter receives linearly polarized light.

30. The system of claim 26, wherein said polarization splitter receives elliptically polarized light.

31. The system of claim 26, wherein said polarization splitter receives unpolarized light.

32. A power equalizer, comprising:
an optical cavity adapted to receive an optical signal containing a plurality of wavelengths; and
a photo-refractive medium disposed within said optical cavity, wherein the optical cavity is configured to filter higher power wavelengths more than lower power wavelengths, thereby substantially equalizing power of at least a portion of said plurality of wavelengths.

33. A power equalizer as claimed in claim 32, wherein the photo-refractive medium has a resultant change in refractive index ($\overline{\Delta n}(z)$) of approximately zero.

34. An apparatus, comprising:
an optical cavity for receiving an optical signal having at least one wavelength, wherein said optical cavity has a finesse optically matched to said optical signal; and
a photo-reactive medium disposed within said optical cavity, wherein said photo-reactive medium and said optical cavity are configured to form a diffraction grating in response to the optical signal which reduces the intensity of at least one wavelength in said optical signal.

35. An apparatus as claimed in claim 34, wherein the photo-reactive medium comprises a photo-refractive medium having a resultant change in refractive index ($\overline{\Delta n}(z)$) of approximately zero.

36. A method for equalizing the power of a multi-wavelength optical signal, comprising the steps of:
   directing an optical signal into a Fabry-Perot cavity containing a photo-reactive material;
   reversibly forming a diffraction grating within said Fabry-Perot cavity; and
   scattering at least one frequency of the optical signal by passing the optical signal through the reversibly formed diffraction grating.

37. The method of claim 36, wherein said directing step comprises directing the optical signal so that at least one frequency of the optical signal co-linearly counter-propagates within the photo-reactive material.

38. The method of claim 36, wherein said passing step comprises passing the optical signal through the reversibly formed diffraction grating thereby causing at least one frequency to be diffracted out of the Fabry-Perot cavity.

39. The method of claim 36, wherein said reversibly forming step comprises reversibly forming multiple diffraction gratings within the Fabry-Perot cavity.

40. The method of claim 36, wherein the Fabry-Perot cavity comprises a tunable Fabry-Perot cavity.

41. The method of claim 36, wherein the photo-reactive material comprises a dynamic photo-refractive material.

42. The method of claim 41, wherein the photo-refractive material comprises one of gallium arsenide or other III–V or II–VI semiconductors, lithium niobate, lithium niobate doped with iron, zinc telluride doped with vanadium, zinc telluride doped with vanadium and manganese, and PVK:PDCST:BBP:$C_{60}$.

43. The method of claim 36, further comprising the steps of varying the dimensions of the Fabry-Perot cavity to cause different frequencies in the optical signal to co-linearly counter-propagate.

44. A method of equalizing power in at least a portion of a multi-wavelength optical signal, comprising the steps of:
   directing an optical signal into a Fabry-Perot cavity containing a photo-refractive material thereby causing at least one reversible diffraction grating to be formed based on the spectral distribution of power in the optical signal; and
   optically coupling and outputting a portion of the multi-wavelength optical signal that is not diffracted by said at least one reversible diffraction grating.

45. A power equalizer, comprising:
   an optical cavity adapted to receive an optical signal containing a plurality of wavelengths; and
   a photo-refractive medium disposed within said optical cavity having a resultant change in refractive index ($\overline{\Delta n}(z)$) of approximately zero.

46. A system, comprising:
   a first optical cavity having a first photorefractive medium disposed therein, wherein said first photorefractive medium is capable of adaptively forming a first diffraction grating in response to an intensity of first optical radiation received by said first optical cavity;
   a second optical cavity having a second photorefractive medium disposed therein, wherein said second photo-refractive medium is capable of adaptively forming a second diffraction grating in response to an intensity of second optical radiation received by said second optical cavity; and
   a splitter optically coupled to said first optical cavity and said second optical cavity, said splitter having an input that receives input optical radiation and splits the input optical radiation into the first optical radiation and the second optical radiation.

47. The system of claim 46, further comprising:
   a combiner optically coupled to said first optical cavity and said second optical cavity, wherein said combiner receives said first optical radiation from said first optical cavity and receives said second optical radiation from said second optical cavity, and combines said first optical radiation and said second optical radiation.

48. The system of claim 46, wherein said splitter receives linearly polarized light.

49. The system of claim 46, wherein said splitter receives elliptically polarized light.

50. The system of claim 46, wherein said splitter receives unpolarized light.

51. The system of claim 46, wherein said first optical cavity equalizes the first optical radiation and said second optical cavity equalizes the second optical radiation.

52. A system, comprising:
   an optical cavity comprising a photorefractive medium disposed therein, and a first optical path and a second optical path therethough, wherein said photorefractive medium is capable of adaptively forming a first diffraction grating in response to an intensity of first optical radiation received along said first optical path, and said photorefractive medium is capable of adaptively forming a second diffraction grating in response to an intensity of second optical radiation received along said second optical path; and
   a splitter having a first output optically coupled to said first optical path and a second output optically coupled to said second optical, said splitter having an input that receives input optical radiation and splits the input optical radiation into the first optical radiation and the second optical radiation.

53. The system of claim 52, further comprising:
   a combiner optically coupled to said first optical path and said second optical path, wherein said combiner receives said first optical radiation from said first optical path and receives said second optical radiation from said second optical path, and combines said first optical radiation and said second optical radiation.

54. The system of claim 52, wherein said splitter receives linearly polarized light.

55. The system of claim 52, wherein said splitter receives elliptically polarized light.

56. The system of claim 52, wherein said splitter receives unpolarized light.

57. The system of claim 52, wherein said first diffraction grating equalizes the first optical radiation and said second diffraction grating equalizes the second optical radiation.

58. A method of making an optical power equalizer, comprising:
   forming a partially reflective surface on a first transparent plate and forming a partially reflective surface on a second transparent plate;
   arranging the partially reflective surfaces to be substantially parallel to one another with a gap therebetween; and placing a photo-reactive material in the gap, wherein the reflective surfaces and the photo-reactive material are configured to reversibly form at least one grating in the photo-reactive material in proportion to the strength of at least one wavelength of an optical signal passing therethrough, wherein the amplitude of the grating proportionally tracks the strength of the at least one wavelength of the optical signal.

59. The method of claim 58, wherein forming a partially reflective surface on a first transparent plate and forming a partially reflective surface on a second transparent plate comprises depositing a reflective material on each transparent plate.

60. The method of claim 59, wherein depositing a reflective material comprises depositing a material comprising a metal of a prescribed thickness.

61. The method of claim 59, wherein depositing a reflective material comprises depositing a dielectric material of a prescribed thickness.

62. The method of claim 59, wherein depositing a reflective material comprises depositing a photonic bandgap material of a prescribed thickness.

63. The method of claim 59, wherein the photo-reactive material comprises a material where at least one of its optical properties consisting of index of refraction, reflectivity, transparency, opacity, propagation constants, frequency dispersion, or polarization dispersion is alterable through an interaction with an optical signal.

64. The method of claim 63, wherein the optical property proportionally increases or decreases in accordance with an increase or decrease in the strength of the optical signal, respectively.

65. The method of claim 59, further comprising arranging the gap to have an adjustable width.

66. The method of claim 65, wherein the width is adjustable electrically.

67. The method of claim 65, wherein the width is adjustable thermally.

68. The method of claim 65, wherein the width is adjustable mechanically.

* * * * *